(12) United States Patent
Taylor et al.

(10) Patent No.: US 7,662,348 B2
(45) Date of Patent: Feb. 16, 2010

(54) AIR CONDITIONER DEVICES

(75) Inventors: Charles E. Taylor, Sebastopol, CA (US); Shek Fai Lau, Foster City, CA (US)

(73) Assignee: Sharper Image Acquistion LLC, New York, NY (US)

( * ) Notice: Subject to any disclaimer, the term of this patent is extended or adjusted under 35 U.S.C. 154(b) by 769 days.

(21) Appl. No.: 11/150,046

(22) Filed: Jun. 10, 2005

(65) Prior Publication Data

US 2005/0232831 A1  Oct. 20, 2005

Related U.S. Application Data

(63) Continuation of application No. 10/815,230, filed on Mar. 30, 2004, now Pat. No. 6,953,556, which is a continuation of application No. 09/730,499, filed on Dec. 5, 2000, now Pat. No. 6,713,026, which is a continuation of application No. 09/186,471, filed on Nov. 5, 1998, now Pat. No. 6,176,977.

(51) Int. Cl.
*B01J 19/08* (2006.01)
(52) U.S. Cl. .................. 422/186.04; 422/121; 96/96
(58) Field of Classification Search ............ 422/186.04, 422/121; 96/96
See application file for complete search history.

(56) References Cited

U.S. PATENT DOCUMENTS

| | | | |
|---|---|---|---|
| 653,421 A | 7/1900 | Lorey | |
| 895,729 A | 8/1908 | Carlborg | |
| 995,958 A | 6/1911 | Goldberg | |
| 1,791,338 A | 2/1931 | Wintermute | |
| 1,869,335 A | 7/1932 | Day | |
| 1,882,949 A | 10/1932 | Ruder | |
| 2,129,783 A | 9/1938 | Penney | |
| 2,327,588 A | 8/1943 | Bennett | |
| 2,359,057 A | 9/1944 | Skinner | |
| 2,509,548 A | 5/1950 | White | |
| 2,590,447 A | 3/1952 | Nord et al. | |
| 2,949,550 A | 8/1960 | Brown | |
| 3,018,394 A | 1/1962 | Brown | |
| 3,026,964 A | 3/1962 | Penney | |
| 3,374,941 A | 3/1968 | Okress | |
| 3,518,462 A | 6/1970 | Brown | |
| 3,540,191 A | 11/1970 | Herman | |

(Continued)

FOREIGN PATENT DOCUMENTS

CN    2111112 U    7/1972

(Continued)

OTHER PUBLICATIONS

U.S. Appl. No. 60/104,573, filed Oct. 16, 1998, Krichtafovitch.

(Continued)

*Primary Examiner*—Kishor Mayekar
(74) *Attorney, Agent, or Firm*—Arent Fox LLP

(57) ABSTRACT

An air conditioner includes an ion generator that provides ions and safe amounts of ozone. The ion generator includes a high voltage generator that provides a voltage potential difference between first and second electrode arrays. At least one of the first and second arrays is removable from the housing for cleaning.

24 Claims, 12 Drawing Sheets

U.S. PATENT DOCUMENTS

| | | |
|---|---|---|
| 3,581,470 A | 6/1971 | Aitkenhead et al. |
| 3,638,058 A | 1/1972 | Fritzius |
| 3,744,216 A | 7/1973 | Halloran |
| 3,806,763 A | 4/1974 | Masuda |
| 3,892,927 A | 7/1975 | Lindenberg |
| 3,945,813 A | 3/1976 | Iinoya et al. |
| 3,958,960 A | 5/1976 | Bakke |
| 3,958,961 A | 5/1976 | Bakke |
| 3,958,962 A | 5/1976 | Hayashi |
| 3,981,695 A | 9/1976 | Fuchs |
| 3,984,215 A | 10/1976 | Zucker |
| 3,988,131 A | 10/1976 | Kanazawa et al. |
| 4,007,024 A | 2/1977 | Sallee et al. |
| 4,052,177 A | 10/1977 | Kide |
| 4,056,372 A | 11/1977 | Hayashi |
| 4,070,163 A | 1/1978 | Kolb et al. |
| 4,074,983 A | 2/1978 | Bakke |
| 4,092,134 A | 5/1978 | Kikuchi |
| 4,097,252 A | 6/1978 | Kirchhoff et al. |
| 4,102,654 A | 7/1978 | Pellin |
| 4,104,042 A | 8/1978 | Brozenick |
| 4,110,086 A | 8/1978 | Schwab et al. |
| 4,119,415 A | 10/1978 | Hayashi et al. |
| 4,126,434 A | 11/1978 | Keiichi |
| 4,138,233 A | 2/1979 | Masuda |
| 4,147,522 A | 4/1979 | Gonas et al. |
| 4,155,792 A | 5/1979 | Gelhaar et al. |
| 4,171,975 A | 10/1979 | Kato et al. |
| 4,185,971 A | 1/1980 | Isahaya |
| 4,189,308 A | 2/1980 | Feldman |
| 4,205,969 A | 6/1980 | Matsumoto |
| 4,209,306 A | 6/1980 | Feldman et al. |
| 4,218,225 A | 8/1980 | Kirchhoff et al. |
| 4,225,323 A | 9/1980 | Zarchy et al. |
| 4,227,894 A | 10/1980 | Proynoff |
| 4,231,766 A | 11/1980 | Spurgin |
| 4,232,355 A | 11/1980 | Finger et al. |
| 4,244,710 A | 1/1981 | Burger |
| 4,244,712 A | 1/1981 | Tongret |
| 4,251,234 A | 2/1981 | Chang |
| 4,253,852 A | 3/1981 | Adams |
| 4,259,093 A | 3/1981 | Vlastos et al. |
| 4,259,452 A | 3/1981 | Yukuta et al. |
| 4,259,707 A | 3/1981 | Penney |
| 4,264,343 A | 4/1981 | Natarajan et al. |
| 4,266,948 A | 5/1981 | Teague et al. |
| 4,282,014 A | 8/1981 | Winkler et al. |
| 4,284,420 A | 8/1981 | Borysiak |
| 4,289,504 A | 9/1981 | Scholes |
| 4,293,319 A | 10/1981 | Claassen, Jr. |
| 4,308,036 A | 12/1981 | Zahedi et al. |
| 4,315,188 A | 2/1982 | Cerny et al. |
| 4,318,718 A | 3/1982 | Utsumi et al. |
| 4,338,560 A | 7/1982 | Lemley |
| 4,342,571 A | 8/1982 | Hayashi |
| 4,349,359 A | 9/1982 | Fitch et al. |
| 4,351,648 A | 9/1982 | Penney |
| 4,354,861 A | 10/1982 | Kalt |
| 4,357,150 A | 11/1982 | Masuda et al. |
| 4,362,632 A | 12/1982 | Jacob |
| 4,363,072 A | 12/1982 | Coggins |
| 4,366,525 A | 12/1982 | Baumgartner |
| 4,369,776 A | 1/1983 | Roberts |
| 4,375,364 A | 3/1983 | Van Hoesen et al. |
| 4,380,900 A | 4/1983 | Linder et al. |
| 4,386,395 A | 5/1983 | Francis, Jr. |
| 4,391,614 A | 7/1983 | Rozmus |
| 4,394,239 A | 7/1983 | Kitzelmann et al. |
| 4,405,342 A | 9/1983 | Bergman |
| 4,406,671 A | 9/1983 | Rozmus |
| 4,412,850 A | 11/1983 | Kurata et al. |
| 4,413,225 A | 11/1983 | Donig et al. |
| 4,414,603 A | 11/1983 | Masuda |
| 4,435,190 A | 3/1984 | Taillet et al. |
| 4,440,552 A | 4/1984 | Uchiya et al. |
| 4,443,234 A | 4/1984 | Carlsson |
| 4,445,911 A | 5/1984 | Lind |
| 4,477,263 A | 10/1984 | Shaver et al. |
| 4,477,268 A | 10/1984 | Kalt |
| 4,481,017 A | 11/1984 | Furlong |
| 4,496,375 A | 1/1985 | Levantine |
| 4,502,002 A | 2/1985 | Ando |
| 4,505,724 A | 3/1985 | Baab |
| 4,509,958 A | 4/1985 | Masuda et al. |
| 4,514,780 A | 4/1985 | Brussee et al. |
| 4,515,982 A | 5/1985 | Lechtken et al. |
| 4,516,991 A | 5/1985 | Kawashima |
| 4,521,229 A | 6/1985 | Baker et al. |
| 4,522,634 A | 6/1985 | Frank |
| 4,534,776 A | 8/1985 | Mammel et al. |
| 4,536,698 A | 8/1985 | Shevalenko et al. |
| 4,544,382 A | 10/1985 | Taillet et al. |
| 4,555,252 A | 11/1985 | Eckstein |
| 4,569,684 A | 2/1986 | Ibbott |
| 4,582,961 A | 4/1986 | Frederiksen |
| 4,587,475 A | 5/1986 | Finney, Jr. et al. |
| 4,588,423 A | 5/1986 | Gillingham et al. |
| 4,590,042 A | 5/1986 | Drage |
| 4,597,780 A | 7/1986 | Reif |
| 4,597,781 A | 7/1986 | Spector |
| 4,600,411 A | 7/1986 | Santamaria |
| 4,601,733 A | 7/1986 | Ordines et al. |
| 4,604,174 A | 8/1986 | Bollinger et al. |
| 4,614,573 A | 9/1986 | Masuda |
| 4,623,365 A | 11/1986 | Bergman |
| 4,626,261 A | 12/1986 | Jorgensen |
| 4,632,135 A | 12/1986 | Lenting et al. |
| 4,632,746 A | 12/1986 | Bergman |
| 4,636,981 A | 1/1987 | Ogura |
| 4,643,744 A | 2/1987 | Brooks |
| 4,643,745 A | 2/1987 | Sakakibara et al. |
| 4,647,836 A | 3/1987 | Olsen |
| 4,650,648 A | 3/1987 | Beer et al. |
| 4,656,010 A | 4/1987 | Leitzke et al. |
| 4,657,738 A | 4/1987 | Kanter et al. |
| 4,659,342 A | 4/1987 | Lind |
| 4,662,903 A | 5/1987 | Yanagawa |
| 4,666,474 A | 5/1987 | Cook |
| 4,668,479 A | 5/1987 | Manabe et al. |
| 4,670,026 A | 6/1987 | Hoenig |
| 4,673,416 A * | 6/1987 | Sakakibara et al. ............ 96/79 |
| 4,674,003 A | 6/1987 | Zylka |
| 4,680,496 A | 7/1987 | Letournel et al. |
| 4,686,370 A | 8/1987 | Blach |
| 4,689,056 A | 8/1987 | Noguchi et al. |
| 4,691,829 A | 9/1987 | Auer |
| 4,692,174 A | 9/1987 | Gelfand et al. |
| 4,693,869 A | 9/1987 | Pfaff |
| 4,694,376 A | 9/1987 | Gesslauer |
| 4,702,752 A | 10/1987 | Yanagawa |
| 4,713,092 A | 12/1987 | Kikuchi et al. |
| 4,713,093 A | 12/1987 | Hansson |
| 4,713,724 A | 12/1987 | Voelkel |
| 4,715,870 A | 12/1987 | Masuda et al. |
| 4,725,289 A | 2/1988 | Quintilian |
| 4,726,812 A | 2/1988 | Hirth |
| 4,726,814 A | 2/1988 | Weitman |
| 4,736,127 A | 4/1988 | Jacobsen |
| 4,743,275 A | 5/1988 | Flanagan |
| 4,749,390 A | 6/1988 | Burnett et al. |
| 4,750,921 A | 6/1988 | Sugita et al. |
| 4,760,302 A | 7/1988 | Jacobsen |
| 4,760,303 A | 7/1988 | Miyake |
| 4,765,802 A | 8/1988 | Gombos et al. |

| Patent No. | Date | Name |
|---|---|---|
| 4,771,361 A | 9/1988 | Varga |
| 4,772,297 A | 9/1988 | Anzai |
| 4,779,182 A | 10/1988 | Mickal et al. |
| 4,781,736 A | 11/1988 | Cheney et al. |
| 4,786,844 A | 11/1988 | Farrell et al. |
| 4,789,801 A | 12/1988 | Lee |
| 4,808,200 A | 2/1989 | Dallhammer et al. |
| 4,811,159 A | 3/1989 | Foster, Jr. |
| 4,822,381 A | 4/1989 | Mosley et al. |
| 4,853,005 A | 8/1989 | Jaisinghani et al. |
| 4,869,736 A | 9/1989 | Ivester et al. |
| 4,892,713 A | 1/1990 | Newman |
| 4,929,139 A | 5/1990 | Vorreiter et al. |
| 4,940,470 A | 7/1990 | Jaisinghani et al. |
| 4,940,894 A | 7/1990 | Morters |
| 4,941,068 A | 7/1990 | Hofmann |
| 4,941,224 A | 7/1990 | Saeki et al. |
| 4,944,778 A | 7/1990 | Yanagawa |
| 4,954,320 A | 9/1990 | Birmingham et al. |
| 4,955,991 A | 9/1990 | Torok et al. |
| 4,966,666 A | 10/1990 | Waltonen |
| 4,967,119 A | 10/1990 | Torok et al. |
| 4,976,752 A | 12/1990 | Torok et al. |
| 4,978,372 A | 12/1990 | Pick |
| D315,598 S | 3/1991 | Yamamoto et al. |
| 5,003,774 A | 4/1991 | Leonard |
| 5,006,761 A | 4/1991 | Torok et al. |
| 5,010,869 A | 4/1991 | Lee |
| 5,012,093 A | 4/1991 | Shimizu |
| 5,012,094 A | 4/1991 | Hamade |
| 5,012,159 A | 4/1991 | Torok et al. |
| 5,022,979 A | 6/1991 | Hijikata et al. |
| 5,024,685 A | 6/1991 | Torok et al. |
| 5,030,254 A | 7/1991 | Heyen et al. |
| 5,034,033 A | 7/1991 | Alsup et al. |
| 5,037,456 A | 8/1991 | Yu |
| 5,045,095 A | 9/1991 | You |
| 5,053,912 A | 10/1991 | Loreth et al. |
| 5,059,219 A | 10/1991 | Plaks et al. |
| 5,061,462 A | 10/1991 | Suzuki |
| 5,066,313 A | 11/1991 | Mallory, Sr. |
| 5,072,746 A | 12/1991 | Kantor |
| 5,076,820 A | 12/1991 | Gurvitz |
| 5,077,468 A | 12/1991 | Hamade |
| 5,077,500 A | 12/1991 | Torok et al. |
| 5,100,440 A | 3/1992 | Stahel et al. |
| RE33,927 E | 5/1992 | Fuzimura |
| D326,514 S | 5/1992 | Alsup et al. |
| 5,118,942 A | 6/1992 | Hamade |
| 5,125,936 A | 6/1992 | Johansson |
| 5,136,461 A | 8/1992 | Zellweger |
| 5,137,546 A | 8/1992 | Steinbacher et al. |
| 5,141,529 A | 8/1992 | Oakley et al. |
| 5,141,715 A | 8/1992 | Sackinger et al. |
| D329,284 S | 9/1992 | Patton |
| 5,147,429 A | 9/1992 | Bartholomew et al. |
| 5,154,733 A | 10/1992 | Fujii et al. |
| 5,158,580 A | 10/1992 | Chang |
| D332,655 S | 1/1993 | Lytle et al. |
| 5,180,404 A | 1/1993 | Loreth et al. |
| 5,183,480 A | 2/1993 | Raterman et al. |
| 5,196,171 A | 3/1993 | Peltier |
| 5,198,003 A | 3/1993 | Haynes |
| 5,199,257 A | 4/1993 | Colletta et al. |
| 5,210,678 A | 5/1993 | Lain et al. |
| 5,215,558 A | 6/1993 | Moon |
| 5,217,504 A | 6/1993 | Johansson |
| 5,217,511 A | 6/1993 | Plaks et al. |
| 5,234,555 A | 8/1993 | Ibbott |
| 5,248,324 A | 9/1993 | Hara |
| 5,250,267 A | 10/1993 | Johnson et al. |
| 5,254,155 A | 10/1993 | Mensi |
| 5,266,004 A | 11/1993 | Tsumurai et al. |
| 5,271,763 A | 12/1993 | Jang |
| 5,282,891 A | 2/1994 | Durham |
| 5,290,343 A * | 3/1994 | Morita et al. .................. 96/39 |
| 5,296,019 A | 3/1994 | Oakley et al. |
| 5,302,190 A | 4/1994 | Williams |
| 5,308,586 A | 5/1994 | Fritsche et al. |
| 5,315,838 A | 5/1994 | Thompson |
| 5,316,741 A | 5/1994 | Sewell et al. |
| 5,330,559 A | 7/1994 | Cheney et al. |
| 5,348,571 A | 9/1994 | Weber |
| 5,376,168 A | 12/1994 | Inculet |
| 5,378,978 A | 1/1995 | Gallo et al. |
| 5,386,839 A | 2/1995 | Chen |
| 5,395,430 A | 3/1995 | Lundgren et al. |
| 5,401,301 A | 3/1995 | Schulmerich et al. |
| 5,401,302 A | 3/1995 | Schulmerich et al. |
| 5,403,383 A | 4/1995 | Jaisinghani |
| 5,405,434 A | 4/1995 | Inculet |
| 5,407,469 A | 4/1995 | Sun |
| 5,407,639 A | 4/1995 | Watanabe et al. |
| 5,417,936 A | 5/1995 | Suzuki et al. |
| 5,419,953 A | 5/1995 | Chapman |
| 5,433,772 A | 7/1995 | Sikora |
| 5,435,817 A | 7/1995 | Davis et al. |
| 5,435,978 A | 7/1995 | Yokomi |
| 5,437,713 A | 8/1995 | Chang |
| 5,437,843 A | 8/1995 | Kuan |
| 5,445,798 A | 8/1995 | Ikeda et al. |
| 5,466,279 A | 11/1995 | Hattori et al. |
| 5,468,454 A | 11/1995 | Kim |
| 5,474,599 A | 12/1995 | Cheney et al. |
| 5,484,472 A | 1/1996 | Weinberg |
| 5,484,473 A | 1/1996 | Bontempi |
| 5,492,678 A | 2/1996 | Ota et al. |
| 5,501,844 A | 3/1996 | Kasting, Jr. et al. |
| 5,503,808 A | 4/1996 | Garbutt et al. |
| 5,503,809 A | 4/1996 | Coate et al. |
| 5,505,914 A | 4/1996 | Tona-Serra |
| 5,508,008 A | 4/1996 | Wasser |
| 5,514,345 A | 5/1996 | Garbutt et al. |
| 5,516,493 A | 5/1996 | Bell et al. |
| 5,518,531 A | 5/1996 | Joannu |
| 5,520,887 A | 5/1996 | Shimizu et al. |
| 5,525,310 A | 6/1996 | Decker et al. |
| 5,529,613 A | 6/1996 | Yavnieli |
| 5,529,760 A | 6/1996 | Burris |
| 5,532,798 A | 7/1996 | Nakagami et al. |
| 5,535,089 A | 7/1996 | Ford et al. |
| 5,536,477 A | 7/1996 | Cha et al. |
| 5,538,695 A | 7/1996 | Shinjo et al. |
| 5,540,761 A | 7/1996 | Yamamoto |
| 5,542,967 A | 8/1996 | Ponizovsky et al. |
| 5,545,379 A | 8/1996 | Gray |
| 5,545,380 A | 8/1996 | Gray |
| 5,547,643 A | 8/1996 | Nomoto et al. |
| 5,549,874 A | 8/1996 | Kimiya et al. |
| 5,554,344 A | 9/1996 | Duarte |
| 5,554,345 A | 9/1996 | Kitchenman |
| 5,569,368 A | 10/1996 | Larsky et al. |
| 5,569,437 A | 10/1996 | Stiehl et al. |
| D375,546 S | 11/1996 | Lee |
| 5,571,483 A | 11/1996 | Pfingstl et al. |
| 5,573,577 A | 11/1996 | Joannou |
| 5,573,730 A | 11/1996 | Gillum |
| 5,578,112 A | 11/1996 | Krause |
| 5,578,280 A | 11/1996 | Kazi et al. |
| 5,582,632 A | 12/1996 | Nohr et al. |
| 5,587,131 A | 12/1996 | Malkin et al. |
| D377,523 S | 1/1997 | Marvin et al. |
| 5,591,253 A | 1/1997 | Altman et al. |
| 5,591,334 A | 1/1997 | Shimizu et al. |
| 5,591,412 A | 1/1997 | Jones et al. |
| 5,593,476 A | 1/1997 | Coppom |

| | | | | | |
|---|---|---|---|---|---|
| 5,601,636 A | 2/1997 | Glucksman | 6,362,604 B1 | 3/2002 | Cravey |
| 5,603,752 A | 2/1997 | Hara | 6,372,097 B1 | 4/2002 | Chen |
| 5,603,893 A | 2/1997 | Gundersen et al. | 6,373,723 B1 | 4/2002 | Wallgren et al. |
| 5,614,002 A | 3/1997 | Chen | 6,379,427 B1 | 4/2002 | Siess |
| 5,624,476 A | 4/1997 | Eyraud | 6,391,259 B1 | 5/2002 | Malkin et al. |
| 5,630,866 A | 5/1997 | Gregg | 6,398,852 B1 | 6/2002 | Loreth |
| 5,630,990 A | 5/1997 | Conrad et al. | 6,447,587 B1 | 9/2002 | Pillion et al. |
| 5,637,198 A | 6/1997 | Breault | 6,451,266 B1 | 9/2002 | Lau et al. |
| 5,637,279 A | 6/1997 | Besen et al. | 6,464,754 B1 | 10/2002 | Ford |
| 5,641,342 A | 6/1997 | Smith et al. | 6,471,753 B1 | 10/2002 | Ahn et al. |
| 5,641,461 A | 6/1997 | Ferone | 6,494,940 B1 | 12/2002 | Hak |
| 5,647,890 A | 7/1997 | Yamamoto | 6,504,308 B1 | 1/2003 | Krichtafovitch et al. |
| 5,648,049 A | 7/1997 | Jones et al. | 6,508,982 B1 | 1/2003 | Shoji |
| 5,655,210 A | 8/1997 | Gregoire et al. | 6,544,485 B1 | 4/2003 | Taylor |
| 5,656,063 A | 8/1997 | Hsu | 6,585,935 B1 | 7/2003 | Taylor et al. |
| 5,665,147 A | 9/1997 | Taylor et al. | 6,588,434 B1 | 7/2003 | Taylor et al. |
| 5,667,563 A | 9/1997 | Silva, Jr. | 6,603,268 B2 | 8/2003 | Lee |
| 5,667,564 A | 9/1997 | Weinberg | 6,613,277 B1 | 9/2003 | Monagan |
| 5,667,565 A | 9/1997 | Gondar | 6,632,407 B1 | 10/2003 | Lau et al. |
| 5,667,756 A | 9/1997 | Ho | 6,635,105 B2 | 10/2003 | Ahlborn et al. |
| 5,669,963 A | 9/1997 | Horton et al. | 6,672,315 B2 | 1/2004 | Taylor et al. |
| 5,678,237 A | 10/1997 | Powell et al. | 6,709,484 B2 | 3/2004 | Lau et al. |
| 5,681,434 A | 10/1997 | Eastlund | 6,713,026 B2 * | 3/2004 | Taylor et al. ........... 422/186.04 |
| 5,681,533 A | 10/1997 | Hiromi | 6,735,830 B2 | 5/2004 | Merciel |
| 5,698,164 A | 12/1997 | Kishioka et al. | 6,749,667 B2 | 6/2004 | Reeves et al. |
| 5,702,507 A | 12/1997 | Wang | 6,753,652 B2 | 6/2004 | Kim |
| D389,567 S | 1/1998 | Gudefin | 6,761,796 B2 | 7/2004 | Srivastava et al. |
| 5,766,318 A | 6/1998 | Loreth et al. | 6,768,108 B2 | 7/2004 | Hirano et al. |
| 5,779,769 A | 7/1998 | Jiang | 6,768,110 B2 | 7/2004 | Alani |
| 5,814,135 A | 9/1998 | Weinberg | 6,768,120 B2 | 7/2004 | Leung et al. |
| 5,879,435 A | 3/1999 | Satyapal et al. | 6,768,121 B2 | 7/2004 | Horsky et al. |
| 5,893,977 A | 4/1999 | Pucci | 6,770,878 B2 | 8/2004 | Uhlemann et al. |
| 5,911,957 A | 6/1999 | Khatchatrian et al. | 6,774,359 B1 | 8/2004 | Hirabayashi et al. |
| 5,925,172 A * | 7/1999 | Rick et al. .................... 96/397 | 6,777,686 B2 | 8/2004 | Olson et al. |
| 5,972,076 A | 10/1999 | Nichols et al. | 6,777,699 B1 | 8/2004 | Miley et al. |
| 5,975,090 A | 11/1999 | Taylor et al. | 6,777,882 B2 | 8/2004 | Goldberg et al. |
| 5,980,614 A | 11/1999 | Loreth et al. | 6,781,136 B1 | 8/2004 | Kato |
| 5,993,521 A | 11/1999 | Loreth et al. | 6,785,912 B1 | 9/2004 | Julio |
| 5,997,619 A | 12/1999 | Knuth et al. | 6,791,814 B2 | 9/2004 | Adachi et al. |
| 6,019,815 A | 2/2000 | Satyapal et al. | 6,794,661 B2 | 9/2004 | Tsukihara et al. |
| 6,036,757 A * | 3/2000 | Gatchell et al. ............... 96/424 | 6,797,339 B2 | 9/2004 | Akizuki et al. |
| 6,042,637 A | 3/2000 | Weinberg | 6,797,964 B2 | 9/2004 | Yamashita |
| 6,063,168 A | 5/2000 | Nichols et al. | 6,799,068 B1 | 9/2004 | Hartmann et al. |
| 6,086,657 A | 7/2000 | Freije | 6,800,862 B2 | 10/2004 | Matsumoto et al. |
| 6,117,216 A | 9/2000 | Loreth | 6,803,585 B2 | 10/2004 | Glukhoy |
| 6,118,645 A | 9/2000 | Partridge | 6,805,916 B2 | 10/2004 | Cadieu |
| 6,126,722 A | 10/2000 | Mitchell et al. | 6,806,035 B1 | 10/2004 | Atireklapvarodom et al. |
| 6,126,727 A | 10/2000 | Lo | 6,806,163 B2 | 10/2004 | Wu et al. |
| 6,149,717 A | 11/2000 | Satyapal et al. | 6,806,468 B2 | 10/2004 | Laiko et al. |
| 6,149,815 A | 11/2000 | Sauter | 6,808,606 B2 | 10/2004 | Thomsen et al. |
| 6,152,146 A | 11/2000 | Taylor et al. | 6,809,310 B2 | 10/2004 | Chen |
| 6,163,098 A | 12/2000 | Taylor et al. | 6,809,312 B1 | 10/2004 | Park et al. |
| 6,176,977 B1 | 1/2001 | Taylor et al. | 6,809,325 B2 | 10/2004 | Dahl et al. |
| 6,182,461 B1 | 2/2001 | Washburn et al. | 6,812,647 B2 | 11/2004 | Cornelius |
| 6,182,671 B1 | 2/2001 | Taylor et al. | 6,815,690 B2 | 11/2004 | Veerasamy et al. |
| 6,193,852 B1 | 2/2001 | Caracciolo et al. | 6,818,257 B2 | 11/2004 | Amann et al. |
| 6,203,600 B1 | 3/2001 | Loreth | 6,818,909 B2 | 11/2004 | Murrell et al. |
| 6,212,883 B1 | 4/2001 | Kang | 6,819,053 B2 | 11/2004 | Johnson |
| 6,228,149 B1 | 5/2001 | Alenichev et al. | 6,863,869 B2 | 3/2005 | Taylor et al. |
| 6,252,012 B1 | 6/2001 | Egitto et al. | 6,896,853 B2 | 5/2005 | Law et al. |
| 6,270,733 B1 | 8/2001 | Rodden | 6,911,186 B2 | 6/2005 | Taylor et al. |
| 6,277,248 B1 | 8/2001 | Ishioka et al. | 2001/0048906 A1 | 12/2001 | Lau et al. |
| 6,282,106 B2 | 8/2001 | Grass | 2002/0069760 A1 | 6/2002 | Pruette et al. |
| D449,097 S | 10/2001 | Smith et al. | 2002/0079212 A1 | 6/2002 | Taylor et al. |
| D449,679 S | 10/2001 | Smith et al. | 2002/0098131 A1 | 7/2002 | Taylor et al. |
| 6,296,692 B1 | 10/2001 | Gutmann | 2002/0122751 A1 | 9/2002 | Sinaiko et al. |
| 6,302,944 B1 | 10/2001 | Hoenig | 2002/0122752 A1 | 9/2002 | Taylor et al. |
| 6,309,514 B1 | 10/2001 | Conrad et al. | 2002/0127156 A1 | 9/2002 | Taylor |
| 6,312,507 B1 | 11/2001 | Taylor et al. | 2002/0134664 A1 | 9/2002 | Taylor et al. |
| 6,315,821 B1 | 11/2001 | Pillion et al. | 2002/0134665 A1 | 9/2002 | Taylor et al. |
| 6,328,791 B1 | 12/2001 | Pillion et al. | 2002/0141914 A1 | 10/2002 | Lau et al. |
| 6,348,103 B1 | 2/2002 | Ahlborn et al. | 2002/0144601 A1 | 10/2002 | Palestro et al. |
| 6,350,417 B1 | 2/2002 | Lau et al. | 2002/0146356 A1 | 10/2002 | Sinaiko et al. |

| | | | |
|---|---|---|---|
| 2002/0150520 | A1 | 10/2002 | Taylor et al. |
| 2002/0152890 | A1 | 10/2002 | Leiser |
| 2002/0155041 | A1 | 10/2002 | McKinney, Jr. et al. |
| 2002/0170435 | A1 | 11/2002 | Joannou |
| 2002/0190658 | A1 | 12/2002 | Lee |
| 2002/0195951 | A1 | 12/2002 | Lee |
| 2003/0005824 | A1 | 1/2003 | Katou et al. |
| 2003/0170150 | A1 | 9/2003 | Lau et al. |
| 2003/0206837 | A1 | 11/2003 | Taylor et al. |
| 2003/0206839 | A1 | 11/2003 | Taylor et al. |
| 2003/0206840 | A1 | 11/2003 | Taylor et al. |
| 2004/0033176 | A1 | 2/2004 | Lee et al. |
| 2004/0052700 | A1 | 3/2004 | Kotlyar et al. |
| 2004/0065202 | A1 | 4/2004 | Gatchell et al. |
| 2004/0096376 | A1 | 5/2004 | Taylor et al. |
| 2004/0136863 | A1 | 7/2004 | Yates et al. |
| 2004/0166037 | A1 | 8/2004 | Youdell et al. |
| 2004/0226447 | A1 | 11/2004 | Lau et al. |
| 2004/0234431 | A1 | 11/2004 | Taylor et al. |
| 2004/0237787 | A1 | 12/2004 | Reeves et al. |
| 2004/0251124 | A1 | 12/2004 | Lau |
| 2004/0251909 | A1 | 12/2004 | Taylor et al. |
| 2005/0000793 | A1 | 1/2005 | Taylor et al. |

FOREIGN PATENT DOCUMENTS

| | | |
|---|---|---|
| CN | 87210843 U | 7/1988 |
| CN | 2138764 Y | 6/1993 |
| CN | 2153231 Y | 12/1993 |
| DE | 2206057 | 8/1973 |
| DE | 197 41 621 C 1 | 6/1999 |
| EP | 0433152 A1 | 12/1990 |
| EP | 0332624 B1 | 1/1992 |
| FR | 2690509 | 10/1993 |
| GB | 643363 | 9/1950 |
| JP | S51-90077 | 8/1976 |
| JP | S62-20653 | 2/1987 |
| JP | S63-164948 | 10/1988 |
| JP | 10137007 | 5/1998 |
| JP | 11104223 | 4/1999 |
| JP | 2000236914 | 9/2000 |
| WO | WO 92/05875 A1 | 4/1992 |
| WO | WO 96/04703 A1 | 2/1996 |
| WO | WO 99/07474 A1 | 2/1999 |
| WO | WO 00/10713 A1 | 3/2000 |
| WO | WO 01/47803 A1 | 7/2001 |
| WO | WO 01/48781 A1 | 7/2001 |
| WO | WO 01/64349 A1 | 9/2001 |
| WO | WO 01/85348 A2 | 11/2001 |
| WO | WO 02/20162 A2 | 3/2002 |
| WO | WO 02/20163 A2 | 3/2002 |
| WO | WO 02/30574 A1 | 4/2002 |
| WO | WO 02/32578 A1 | 4/2002 |
| WO | WO 02/42003 A1 | 5/2002 |
| WO | WO 02/066167 A1 | 8/2002 |
| WO | WO 03/009944 A1 | 2/2003 |
| WO | WO 03/013620 A1 | 2/2003 |
| WO | WO 03/013734 AA | 2/2003 |

OTHER PUBLICATIONS

U.S. Appl. No. 60/306,479, filed Jul. 18, 2001, Taylor.
U.S. Appl. No. 60/341,179, filed Dec. 13, 2001, Taylor et al.
U.S. Appl. No. 60/340,702, filed Dec. 13, 2001, Taylor et al.
U.S. Appl. No. 60/341,377, filed Dec. 13, 2001, Taylor et al.
U.S. Appl. No. 60/341,518, filed Dec. 13, 2001, Taylor.
U.S. Appl. No. 60/340,288, filed Dec. 13, 2001, Taylor.
U.S. Appl. No. 60/341,176, filed Dec. 13, 2001, Taylor.
U.S. Appl. No. 60/340,462, filed Dec. 13, 2001, Taylor.
U.S. Appl. No. 60/340,090, filed Dec. 13, 2001, Taylor.
U.S. Appl. No. 60/341,433, filed Dec. 13, 2001, Taylor.
U.S. Appl. No. 60/341,592, filed Dec. 13, 2001, Taylor.
U.S. Appl. No. 60/341,320, filed Dec. 13, 2001, Taylor.
U.S. Appl. No. 60/391,070, filed Jun. 6, 2002, Reeves.
Electrical schematic and promotional material available from Zenion Industries, 7 pages, Aug. 1990.
Promotional material available from Zenion Industries for the Plasma-Pure 100/200/300, 2 pages, Aug. 1990.
Promotional material available from Zenion Industries for the Plasma-Tron, 2 pages, Aug. 1990.
LENTEK Sila™ Plug-In Air Purifier/Deodorizer product box copyrighted 1999, 13 pages.
Trion Console 250 Electronic Air Cleaner, Model Series 442857 and 445600, Manual for Installation•Operation•Maintenance, Trion Inc., 7 pp., believed to be at least one year prior to Nov. 5, 1998.
Trion 350 Air Purifier, Model 450111-010, http://www.feddersoutlet.com/trion350.html, 12 pp., believed to be at least one year prior to Nov. 5, 1998.
Trion 150 Air Purifier, Model 45000-002, http://www.feddersoutlet.com/trion150.html, 11 pp., believed to be at least one year prior to Nov. 5, 1998.
Trion 120 Air Purifier, Model 442501-025, http://www.feddersoutled.com/trion120.html, 16 pp., believed to be at least one year prior to Nov. 5, 1998.
Friedrich C-90A Electronic Air Cleaner, Service Information, Friedrich Air Conditioning Co., 12 pp., 1985.
LakeAir Excel and Maxum Portable Electronic Air Cleaners, Operating and Service Manual, LakeAir International, Inc., 11 pp., 1971.
Blueair AV 402 Air Purifier, http://www.air-purifiers-usa.biz/Blueair_AV402.htm, 4 pp., 1996.
Blueair AV 501 Air Purifier, http://www.air-purifiers-usa.biz/Blueair_AV501.htm, 15 pp., 1997.
ConsumerReports.org, "Air Cleaners: Behind the Hype," http://www.consumerreports.org/main/content/printable.jsp?FOLDER%3C%3EFOLDER_id, Oct. 2003, 6 pp.
"Household Air Cleaners," Consumer Reports Magazine, Oct. 1992, 6 pp.
Friedrich C-90A, "How the C-90A Works," BestAirCleaner.com http://www.bestaircleaner.com/faq/c90works.asp, 1 page.
English Translation of Japanese Unexamined Utility Model Application No. S62-20653; Publication Date: Feb. 7, 1987.
English Translation of Japanese Unexamined Patent Application Bulletin No. S51-90077; Publication Date: Aug. 6, 1976.
English Translation of German Published Patent Application 2206057; Publication Date: Aug. 16, 1973.
English Translation of Japanese Unexamined Utility Model Application No. S63-164948; Publication Date: Oct. 27, 1988.
English Translation of German Patent Document DE 197 41 621 C1; Publication Date: Jun. 10, 1999.

* cited by examiner

AIR CONDITIONER DEVICES

CLAIM OF PRIORITY

This application claims priority to and is a continuation of U.S. patent application Ser. No. 09/730,499, filed on Dec. 5, 2000 and entitled "Electro-Kinetic Air Transporter-Conditioner," now U.S. Pat. No. 6,713,026, which is a continuation of U.S. patent application Ser. No. 09/186,471, filed on Nov. 5, 1998 and entitled "Electro-Kinetic Air Transporter-Conditioner," now U.S. Pat. No. 6,176,977, both of which applications are incorporated herein by reference.

FIELD OF THE INVENTION

This invention relates to electro-kinetic conversion of electrical energy into fluid flow of an ionizable dielectric medium, and more specifically to methods and devices for electro-kinetically producing a flow of air from which particulate matter has been substantially removed. Preferably the air flow should contain safe amounts of ozone ($O_3$).

BACKGROUND OF THE INVENTION

The use of an electric motor to rotate a fan blade to create an air flow has long been known in the art. Unfortunately, such fans produce substantial noise, and can present a hazard to children who may be tempted to poke a finger or a pencil into the moving fan blade. Although such fans can produce substantial air flow, e.g., 1,000 ft3/minute or more, substantial electrical power is required to operate the motor, and essentially no conditioning of the flowing air occurs.

It is known to provide such fans with a HEPA-compliant filter element to remove particulate matter larger than perhaps 0.3 µm. Unfortunately, the resistance to air flow presented by the filter element may require doubling the electric motor size to maintain a desired level of airflow. Further, HEPA-compliant filter elements are expensive, and can represent a substantial portion of the sale price of a HEPA-compliant filter-fan unit. While such filter-fan units can condition the air by removing large particles, particulate matter small enough to pass through the filter element is not removed, including bacteria, for example.

It is also known in the art to produce an air flow using electro-kinetic techniques, by which electrical power is directly converted into a flow of air without mechanically moving components. One such system is described in U.S. Pat. No. 4,789,801 to Lee (1988), depicted herein in simplified form as FIGS. 1A and 1B. Lee's system 10 includes an array of small area ("minisectional") electrodes 20 that is spaced-apart symmetrically from an array of larger area ("maxisectional") electrodes 30. The positive terminal of a pulse generator 40 that outputs a train of high voltage pulses (e.g., 0 to perhaps +5 KV) is coupled to the minisectional array, and the negative pulse generator terminal is coupled to the maxisectional array.

The high voltage pulses ionize the air between the arrays, and an air flow 50 from the minisectional array toward the maxisectional array results, without requiring any moving parts. Particulate matter 60 in the air is entrained within the airflow 50 and also moves towards the maxisectional electrodes 30. Much of the particulate matter is electrostatically attracted to the surface of the maxisectional electrode array, where it remains, thus conditioning the flow of air exiting system 10. Further, the high voltage field present between the electrode arrays can release ozone into the ambient environment, which appears to destroy or at least alter whatever is entrained in the airflow, including for example, bacteria.

In the embodiment of FIG. 1A, minisectional electrodes 20 are circular in cross-section, having a diameter of about 0.003" (0.08 mm), whereas the maxisectional electrodes 30 are substantially larger in area and define a "teardrop" shape in cross-section. The ratio of cross-sectional areas between the maxisectional and minisectional electrodes is not explicitly stated, but from Lee's figures appears to exceed 10:1. As shown in FIG. 1A herein, the bulbous front surfaces of the maxisectional electrodes face the minisectional electrodes, and the somewhat sharp trailing edges face the exit direction of the air flow. The "sharpened" trailing edges on the maxisectional electrodes apparently promote good electrostatic attachment of particular matter entrained in the airflow. Lee does not disclose how the teardrop shaped maxisectional electrodes are fabricated, but presumably they are produced using a relatively expensive mold-casting or an extrusion process.

In another embodiment shown herein as FIG. 1B, Lee's maxisectional sectional electrodes 30 are symmetrical and elongated in cross-section. The elongated trailing edges on the maxisectional electrodes provide increased area upon which particulate matter entrained in the airflow can attach. Lee states that precipitation efficiency and desired reduction of anion release into the environment can result from including a passive third array of electrodes 70. Understandably, increasing efficiency by adding a third array of electrodes will contribute to the cost of manufacturing and maintaining the resultant system.

While the electrostatic techniques disclosed by Lee are advantageous to conventional electric fan-filter units, Lee's maxisectional electrodes are relatively expensive to fabricate. Further, increased filter efficiency beyond what Lee's embodiments can produce would be advantageous, especially without including a third array of electrodes.

Thus, there is a need for an electro-kinetic air transporter-conditioner that provides improved efficiency over Lee-type systems, without requiring expensive production techniques to fabricate the electrodes. Preferably such a conditioner should function efficiently without requiring a third array of electrodes. Further, such a conditioner should permit user-selection of safe amounts of ozone to be generated, for example to remove odor from the ambient environment.

The present invention provides a method and apparatus for electro-kinetically transporting and conditioning air.

SUMMARY OF THE PRESENT INVENTION

The present invention provides an electro-kinetic system for transporting and conditioning air without moving parts. The air is conditioned in the sense that it is ionized and contains safe amounts of ozone.

Applicants' electro-kinetic air transporter-conditioner includes a louvered or grilled body that houses an ionizer unit. The ionizer unit includes a high voltage DC inverter that boosts common 110 VAC to high voltage, and a generator that receives the high voltage DC and outputs high voltage pulses of perhaps 10 KV peak-to-peak, although an essentially 100% duty cycle (e.g., high voltage DC) output could be used instead of pulses. The unit also includes an electrode assembly unit comprising first and second spaced-apart arrays of conducting electrodes, the first array and second array being coupled, respectively, preferably to the positive and negative output ports of the high voltage generator.

The electrode assembly preferably is formed using first and second arrays of readily manufacturable electrode types. In one embodiment, the first array comprises wire-like electrodes and the second array comprises "U"-shaped electrodes having one or two trailing surfaces. In an even more efficient embodiment, the first array includes at least one pin or cone-like electrode and the second array is an annular washer-like electrode. The electrode assembly may comprise various combinations of the described first and second array electrodes. In the various embodiments, the ratio between effective area of the second array electrodes to the first array electrodes is at least about 20:1.

The high voltage pulses create an electric field between the first and second electrode arrays. This field produces an electro-kinetic airflow going from the first array toward the second array, the airflow being rich in preferably a net surplus of negative ions and in ozone. Ambient air including dust particles and other undesired components (germs, perhaps) enter the housing through the grill or louver openings, and ionized clean air (with ozone) exits through openings on the downstream side of the housing.

The dust and other particulate matter attaches electrostatically to the second array (or collector) electrodes, and the output air is substantially clean of such particulate matter. Further, ozone generated by the present invention can kill certain types of germs and the like, and also eliminates odors in the output air. Preferably the transporter operates in periodic bursts, and a control permits the user to temporarily increase the high voltage pulse generator output, e.g., to more rapidly eliminate odors in the environment.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1A:
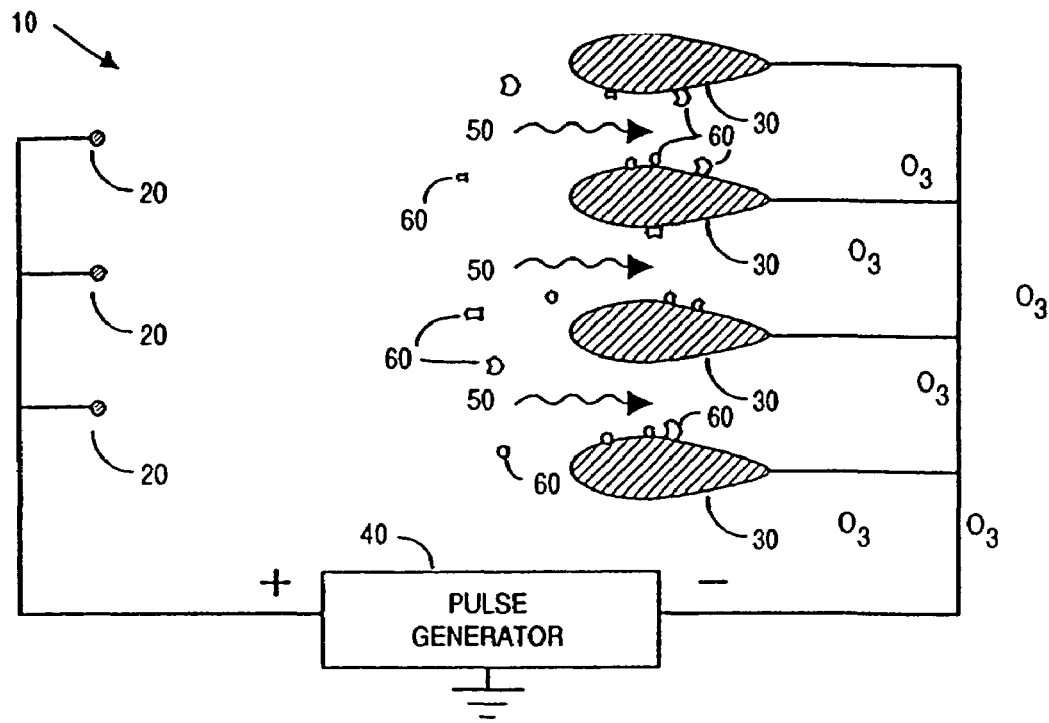
FIG. 1A is a plan, cross-sectional view, of a first embodiment of a prior art electro-kinetic air transporter-conditioner system, according to the prior art.
Figure 1B:
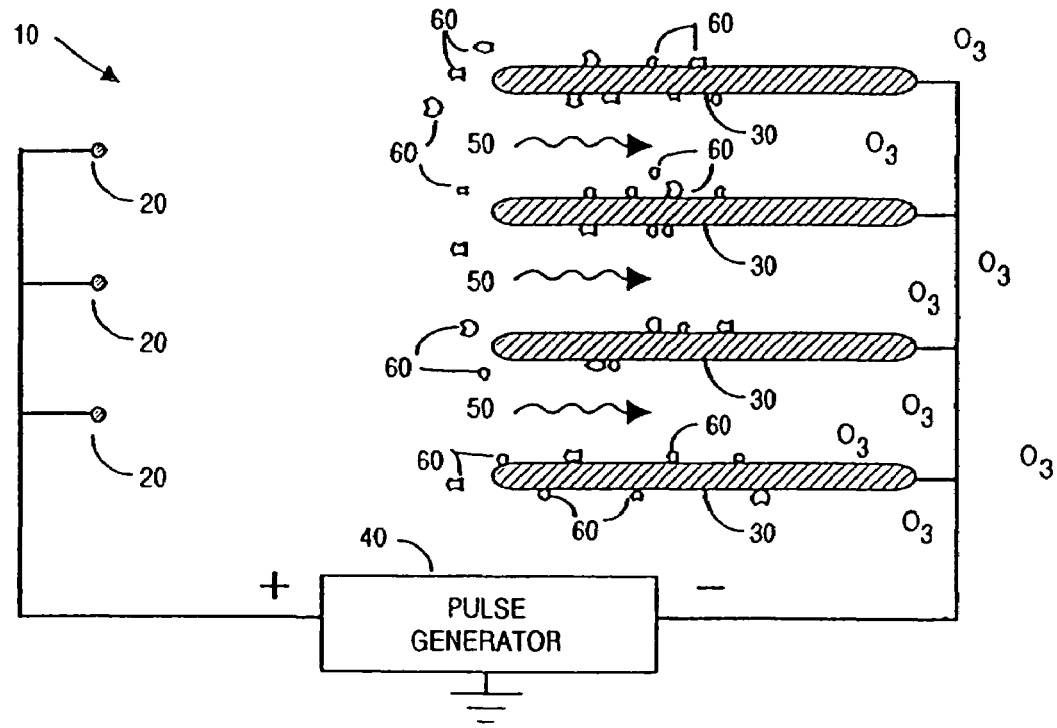
FIG. 1B is a plan, cross-sectional view, of a second embodiment of a prior art electro-kinetic air transporter-conditioner system, according to the prior art.
Figure 2A:
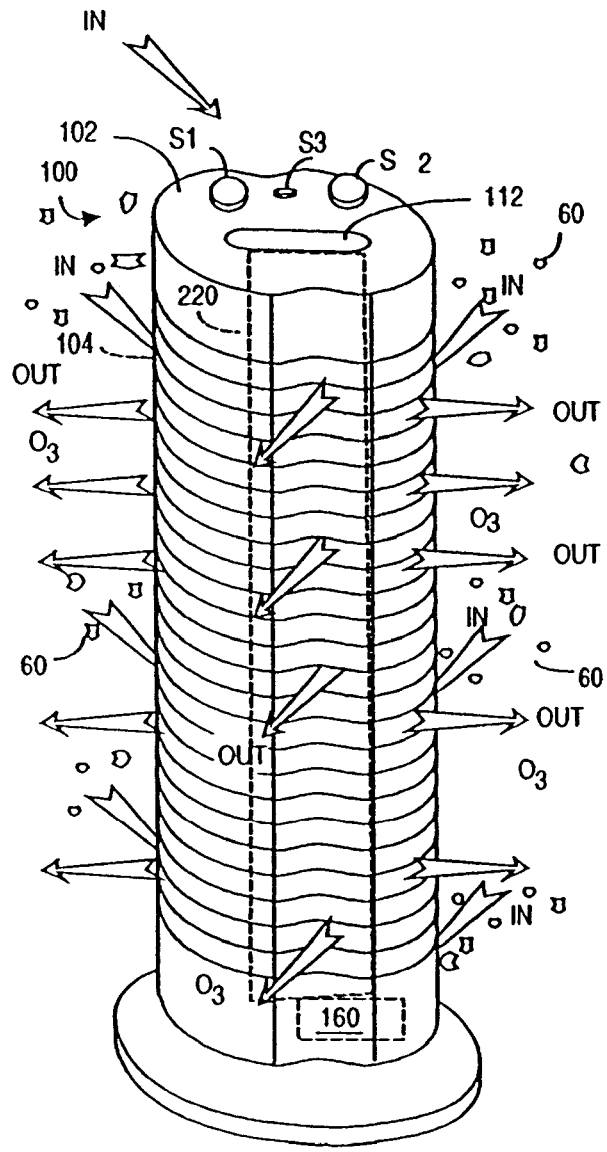
FIG. 2A is an perspective view of a preferred embodiment of the present invention.
Figure 2B:
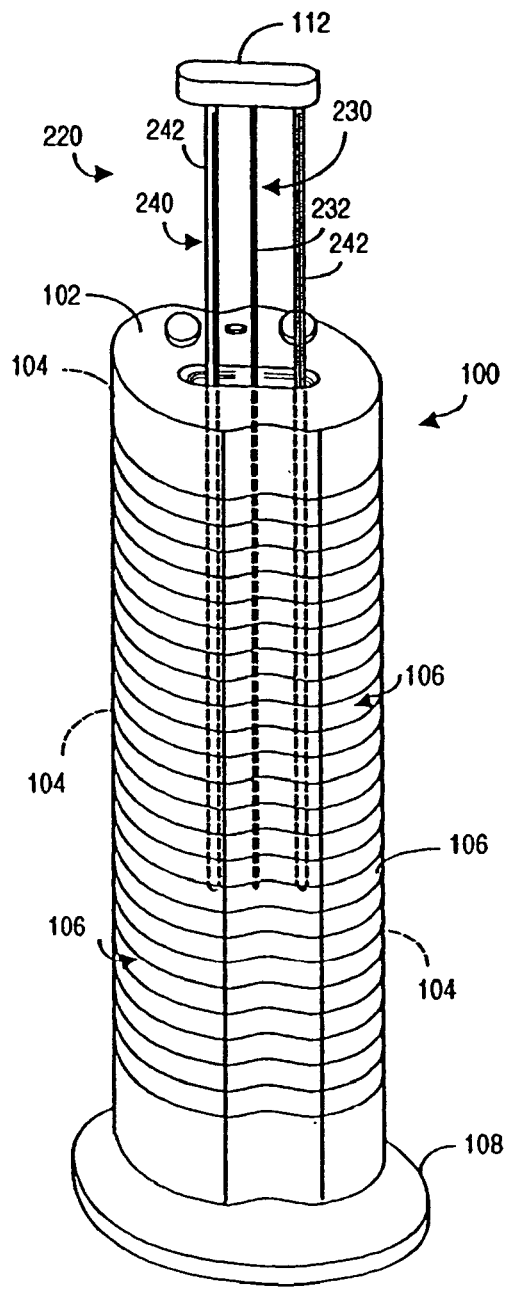
FIG. 2B is a perspective view of the embodiment of FIG. 2A, with the electrode assembly partially withdrawn, according to the present invention.

FIGS. 2A and 2B depict an electro-kinetic air transporter-conditioner system 100 whose housing 102 includes preferably rear-located intake vents or louvers 104 and preferably front and side-located exhaust vents 106, and a base pedestal 108. Internal to the transporter housing is an ion generating unit 160, preferably powered by an AC:DC power supply that is energizable using switch S1. Ion generating unit 160 is self-contained in that other than ambient air, nothing is required from beyond the transporter housing, save external operating potential, for operation of the present invention.

Figure 3:
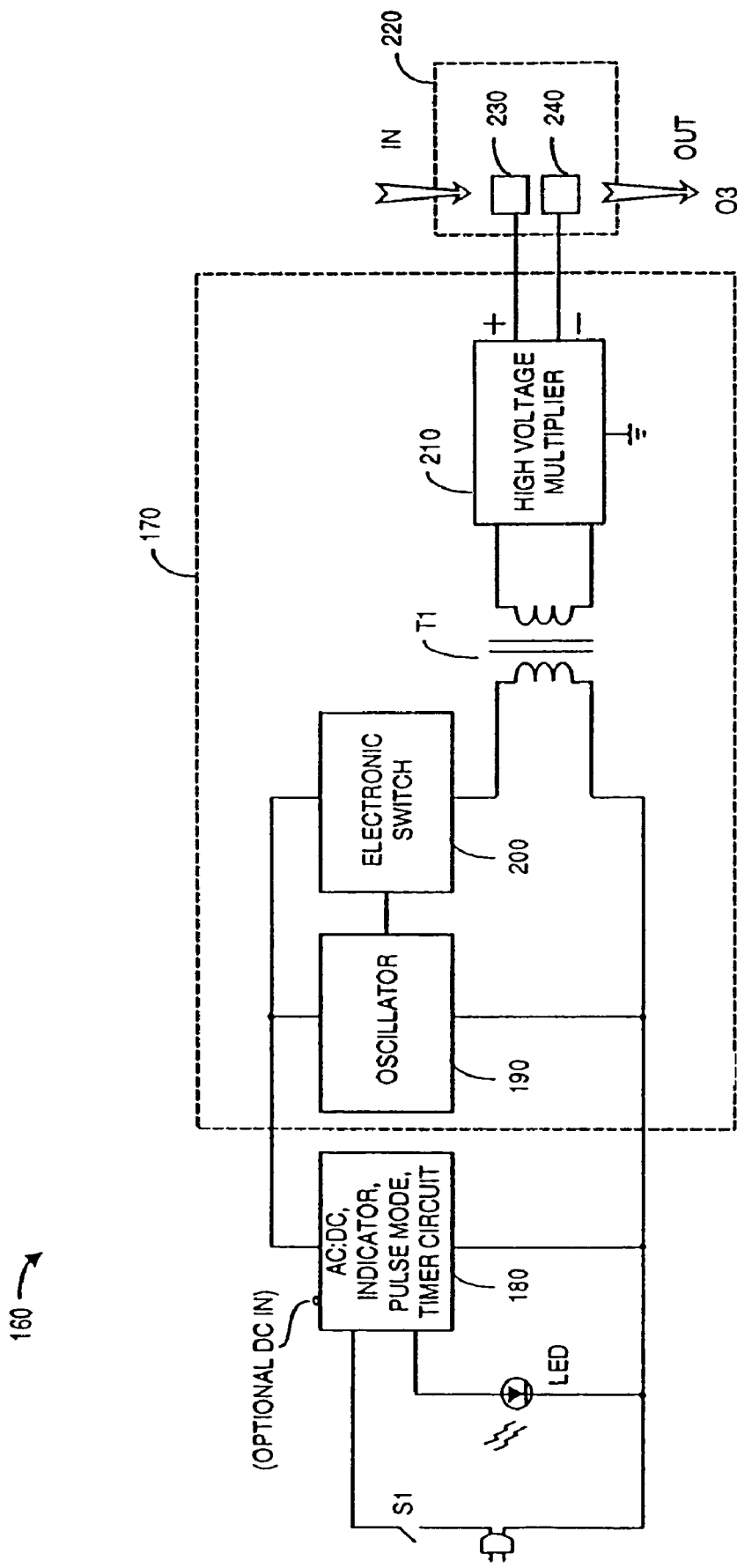
FIG. 3 is an electrical block diagram of the present invention.

The upper surface of housing 102 includes a user-liftable handle 112 to which is affixed an electrode assembly 220 that comprises a first array 230 of electrodes 232 and a second array 240 of electrodes 242. The first and second arrays of electrodes are coupled in series between the output terminals of ion generating unit 160, as best seen in FIG. 3. The ability to lift handle 112 provides ready access to the electrodes comprising the electrode assembly, for purposes of cleaning and, if necessary, replacement.

The general shape of the invention shown in FIGS. 2A and 2B is not critical. The top-to-bottom height of the preferred embodiment is perhaps 1 m, with a left-to-right width of perhaps 15 cm, and a front-to-back depth of perhaps 10 cm, although other dimensions and shapes may of course be used. A louvered construction provides ample inlet and outlet venting in an economical housing configuration. There need be no real distinction between vents 104 and 106, except their location relative to the second array electrodes, and indeed a common vent could be used. These vents serve to ensure that an adequate flow of ambient air may be drawn into or made available to the present invention, and that an adequate flow of ionized air that includes safe amounts of $O_3$ flows out from unit 130.

As will be described, when unit 100 is energized with S1, high voltage output by ion generator 160 produces ions at the first electrode array, which ions are attracted to the second electrode array. The movement of the ions in an "IN" to "OUT" direction carries with them air molecules, thus electrokinetically producing an outflow of ionized air. The "IN" notion in FIGS. 2A and 2B denote the intake of ambient air with particulate matter 60. The "OUT" notation in the figures denotes the outflow of cleaned air substantially devoid of the particulate matter, which adheres electrostatically to the surface of the second array electrodes. In the process of generating the ionized air flow, safe amounts of ozone ($O_3$) are beneficially produced. It may be desired to provide the inner surface of housing 102 with an electrostatic shield to reduces detectable electromagnetic radiation. For example, a metal shield could be disposed within the housing, or portions of the interior of the housing could be coated with a metallic paint to reduce such radiation.

As best seen in FIG. 3, ion generating unit 160 includes a high voltage generator unit 170 and circuitry 180 for converting raw alternating voltage (e.g., 117 VAC) into direct current ("DC") voltage. Circuitry 180 preferably includes circuitry controlling the shape and/or duty cycle of the generator unit output voltage (which control is altered with user switch S2). Circuitry 180 preferably also includes a pulse mode component, coupled to switch S3, to temporarily provide a burst of increased output ozone. Circuitry. 180 can also include a timer circuit and a visual indicator such as a light emitting diode ("LED"). The LED or other indicator (including, if desired, audible indicator) signals when ion generation is occurring. The timer can automatically halt generation of ions and/or ozone after some predetermined time, e.g., 30 minutes. indicator(s), and/or audible indicator(s).

As shown in FIG. 3, high voltage generator unit 170 preferably comprises a low voltage oscillator circuit 190 of perhaps 20 KHz frequency, that outputs low voltage pulses to an electronic switch 200, e.g., a thyristor or the like. Switch 200 switchably couples the low voltage pulses to the input winding of a step-up transformer T1. The secondary winding of T1 is coupled to a high voltage multiplier circuit 210 that outputs high voltage pulses. Preferably the circuitry and components comprising high voltage pulse generator 170 and circuit 180 are fabricated on a printed circuit board that is mounted within housing 102. If desired, external audio input (e.g., from a stereo tuner) could be suitably coupled to oscillator 190 to acoustically modulate the kinetic airflow produced by unit 160. The result would be an electrostatic loudspeaker, whose output air flow is audible to the human ear in accordance with the audio input signal. Further, the output air stream would still include ions and ozone.

Output pulses from high voltage generator 170 preferably are at least 10 KV peak-to-peak with an effective DC offset of perhaps half the peak-to-peak voltage, and have a frequency of perhaps 20 KHz. The pulse train output preferably has a duty cycle of perhaps 10%, which will promote battery lifetime. Of course, different peak-peak amplitudes, DC offsets, pulse train waveshapes, duty cycle, and/or repetition frequencies may instead be used. Indeed, a 100% pulse train (e.g., an essentially DC high voltage) may be used, albeit with shorter battery lifetime. Thus, generator unit 170 may (but need not) be referred to as a high voltage pulse generator.

Frequency of oscillation is not especially critical but frequency of at least about 20 KHz is preferred as being inaudible to humans. If pets will be in the same room as the present invention, it may be desired to utilize an even higher operating frequency, to prevent pet discomfort and/or howling by the pet.

The output from high voltage pulse generator unit 170 is coupled to an electrode assembly 220 that comprises a first electrode array 230 and a second electrode array 240. Unit 170 functions as a DC:DC high voltage generator, and could be implemented using other circuitry and/or techniques to output high voltage pulses that are input to electrode assembly 220.

In the embodiment of FIG. 3, the positive output terminal of unit 170 is coupled to first electrode array 230, and the negative output terminal is coupled to second electrode array 240. This coupling polarity has been found to work well, including minimizing unwanted audible electrode vibration or hum. An electrostatic flow of air is created, going from the first electrode array towards the second electrode array. (This flow is denoted "OUT" in the figures.) Accordingly electrode assembly 220 is mounted within transporter system 100 such that second electrode array 240 is closer to the OUT vents and first electrode array 230 is closer to the IN vents.

When voltage or pulses from high voltage pulse generator 170 are coupled across first and second electrode arrays 230 and 240, it is believed that a plasma-like field is created surrounding electrodes 232 in first array 230. This electric field ionizes the ambient air between the first and second electrode arrays and establishes an "OUT" airflow that moves towards the second array. It is understood that the IN flow enters via vent(s) 104, and that the OUT flow exits via vent(s) 106.

It is believed that ozone and ions are generated simultaneously by the first array electrode(s) 232, essentially as a function of the potential from generator 170 coupled to the first array. Ozone generation may be increased or decreased by increasing or decreasing the potential at the first array. Coupling an opposite polarity potential to the second array electrode(s) 242 essentially accelerates the motion of ions generated at the first array, producing the air flow denoted as "OUT" in the figures. As the ions move toward the second array, it is believed that they push or move air molecules toward the second array. The relative velocity of this motion may be increased by decreasing the potential at the second array relative to the potential at the first array.

For example, if +10 KV were applied to the first array electrode(s), and no potential were applied to the second array electrode(s), a cloud of ions (whose net charge is positive) would form adjacent the first electrode array. Further, the relatively high 10 KV potential would generate substantial ozone. By coupling a relatively negative potential to the second array electrode(s), the velocity of the air mass moved by the net emitted ions increases, as momentum of the moving ions is conserved.

On the other hand, if it were desired to maintain the same effective outflow (OUT) velocity but to generate less ozone, the exemplary 10 KV potential could be divided between the electrode arrays. For example, generator 170 could provide +4 KV (or some other fraction) to the first array electrode(s) and −6 KV (or some other fraction) to the second array electrode(s). In this example, it is understood that the +4 KV and the −6 KV are measured relative to ground. Understandably it is desired that the present invention operate to output safe amounts of ozone. Accordingly, the high voltage is preferably fractionalized with about +4 KV applied to the first array electrode(s) and about −6 KV applied to the second array electrodes.

As noted, outflow (OUT) preferably includes safe amounts of $O_3$ that can destroy or at least substantially alter bacteria, germs, and other living (or quasi-living) matter subjected to the outflow. Thus, when switch S1 is closed and B1 has sufficient operating potential, pulses from high voltage pulse generator unit 170 create an outflow (OUT) of ionized air and $O_3$. When S1 is closed, LED will visually signal when ionization is occurring.

Preferably operating parameters of the present invention are set during manufacture and are not user-adjustable. For example, increasing the peak-to-peak output voltage and/or duty cycle in the high voltage pulses generated by unit 170 can increase air flowrate, ion content, and ozone content. In the preferred embodiment, output flowrate is about 200 feet/minute, ion content is about 2,000,000/cc and ozone content is about 40 ppb (over ambient) to perhaps 2,000 ppb (over ambient). Decreasing the R2/R1 ratio below about 20:1 will decrease flow rate, as will decreasing the peak-to-peak voltage and/or duty cycle of the high voltage pulses coupled between the first and second electrode arrays.

In practice, unit 100 is placed in a room and connected to an appropriate source of operating potential, typically 117 VAC. With S1 energized, ionization unit 160 emits ionized air and preferably some ozone ($O_3$) via outlet vents 150. The air flow, coupled with the ions and ozone freshens the air in the room, and the ozone can beneficially destroy or at least diminish the undesired effects of certain odors, bacteria, germs, and the like. The air flow is indeed electro-kinetically produced, in that there are no intentionally moving parts within the present invention. (As noted, some mechanical vibration may occur within the electrodes.) As will be described with respect to FIG. 4A, it is desirable that the present invention actually output a net surplus of negative ions, as these ions are deemed more beneficial to health than are positive ions.

Having described various aspects of the invention in general, preferred embodiments of electrode assembly 220 will now be described. In the various embodiments, electrode assembly 220 will comprise a first array 230 of at least one electrode 232, and will further comprise a second array 240 of preferably at least one electrode 242. Understandably material(s) for electrodes 232 and 242 should conduct electricity, be resilient to corrosive effects from the application of high voltage, yet be strong enough to be cleaned.

In the various electrode assemblies to be described herein, electrode(s) 232 in the first electrode array 230 are preferably fabricated from tungsten. Tungsten is sufficiently robust to withstand cleaning, has a high melting point to retard breakdown due to ionization, and has a rough exterior surface that seems to promote efficient ionization. On the other hand, electrodes 242 preferably will have a highly polished exterior surface to minimize unwanted point-to-point radiation. As such, electrodes 242 preferably are fabricated from stainless steel, brass, among other materials. The polished surface of electrodes 232 also promotes ease of electrode cleaning.

In contrast to the prior art electrodes disclosed by Lee, electrodes 232 and 242 according to the present invention are light weight, easy to fabricate, and lend themselves to mass production. Further, electrodes 232 and 242 described herein promote more efficient generation of ionized air, and production of safe amounts of ozone, $O_3$.

In the present invention, a high voltage pulse generator 170 is coupled between the first electrode array 230 and the second electrode array 240. The high voltage pulses produce a flow of ionized air that travels in the direction from the first array towards the second array (indicated herein by hollow arrows denoted "OUT"). As such, electrode(s) 232 may be referred to as an emitting electrode, and electrodes 242 may be referred to as collector electrodes. This outflow advantageously contains safe amounts of $O_3$, and exits the present invention from vent(s) 106.

According to the present invention, it is preferred that the positive output terminal or port of the high voltage pulse generator be coupled to electrodes 232, and that the negative output terminal or port be coupled to electrodes 242. It is believed that the net polarity of the emitted ions is positive, e.g., more positive ions than negative ions are emitted. In any event, the preferred electrode assembly electrical coupling minimizes audible hum from electrodes 232 contrasted with reverse polarity (e.g., interchanging the positive and negative output port connections).

However, while generation of positive ions is conducive to a relatively silent air flow, from a health standpoint, it is desired that the output air flow be richer in negative ions, not positive ions. It is noted that in some embodiments, however, one port (preferably the negative port) of the high voltage pulse generator may in fact be the ambient air. Thus, electrodes in the second array need not be connected to the high voltage pulse generator using wire. Nonetheless, there will be an "effective connection" between the second array electrodes and one output port of the high voltage pulse generator, in this instance, via ambient air.

Figure 4A:
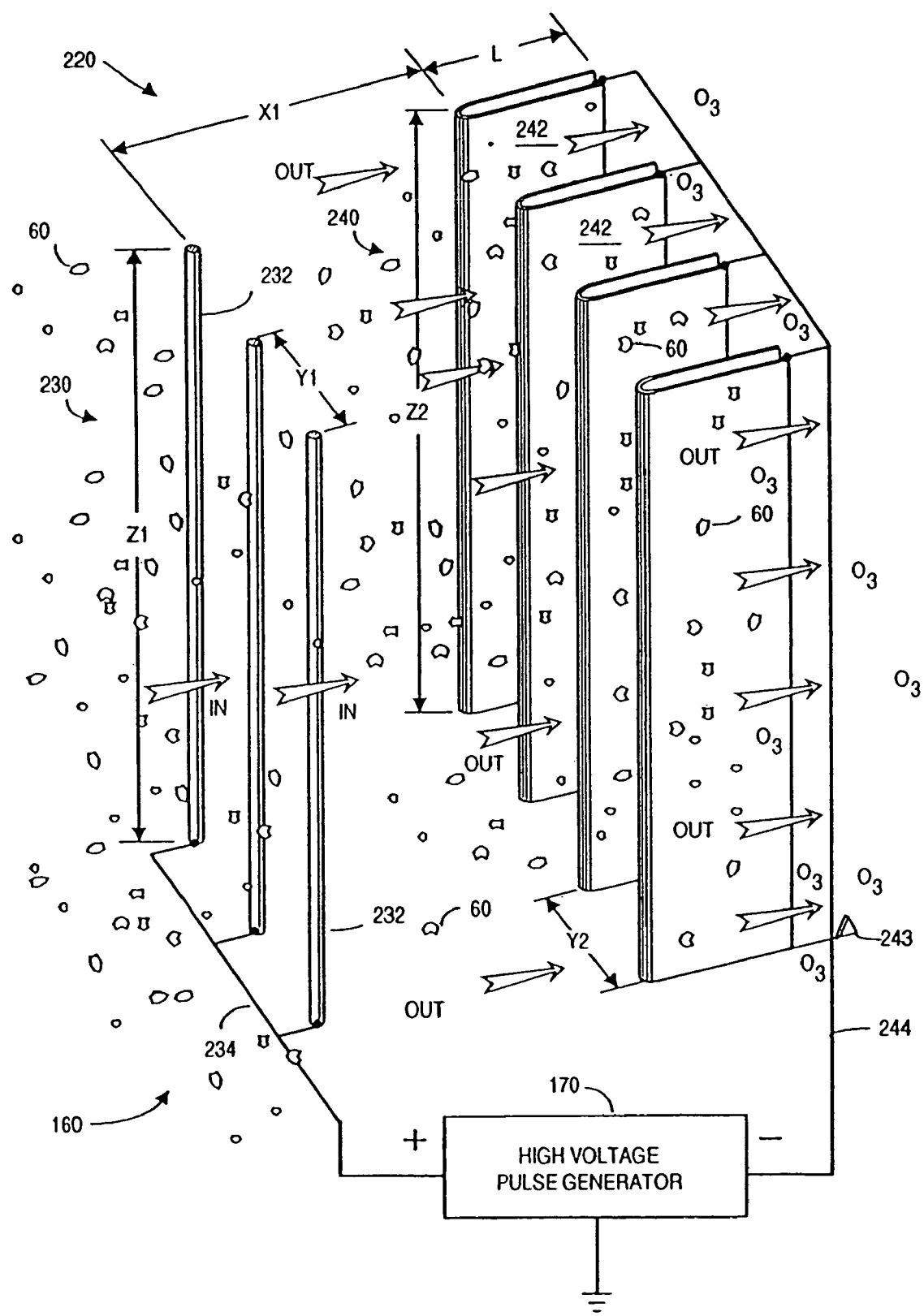
FIG. 4A is a perspective block diagram showing a first embodiment for an electrode assembly, according to the present invention.
Figure 4B:
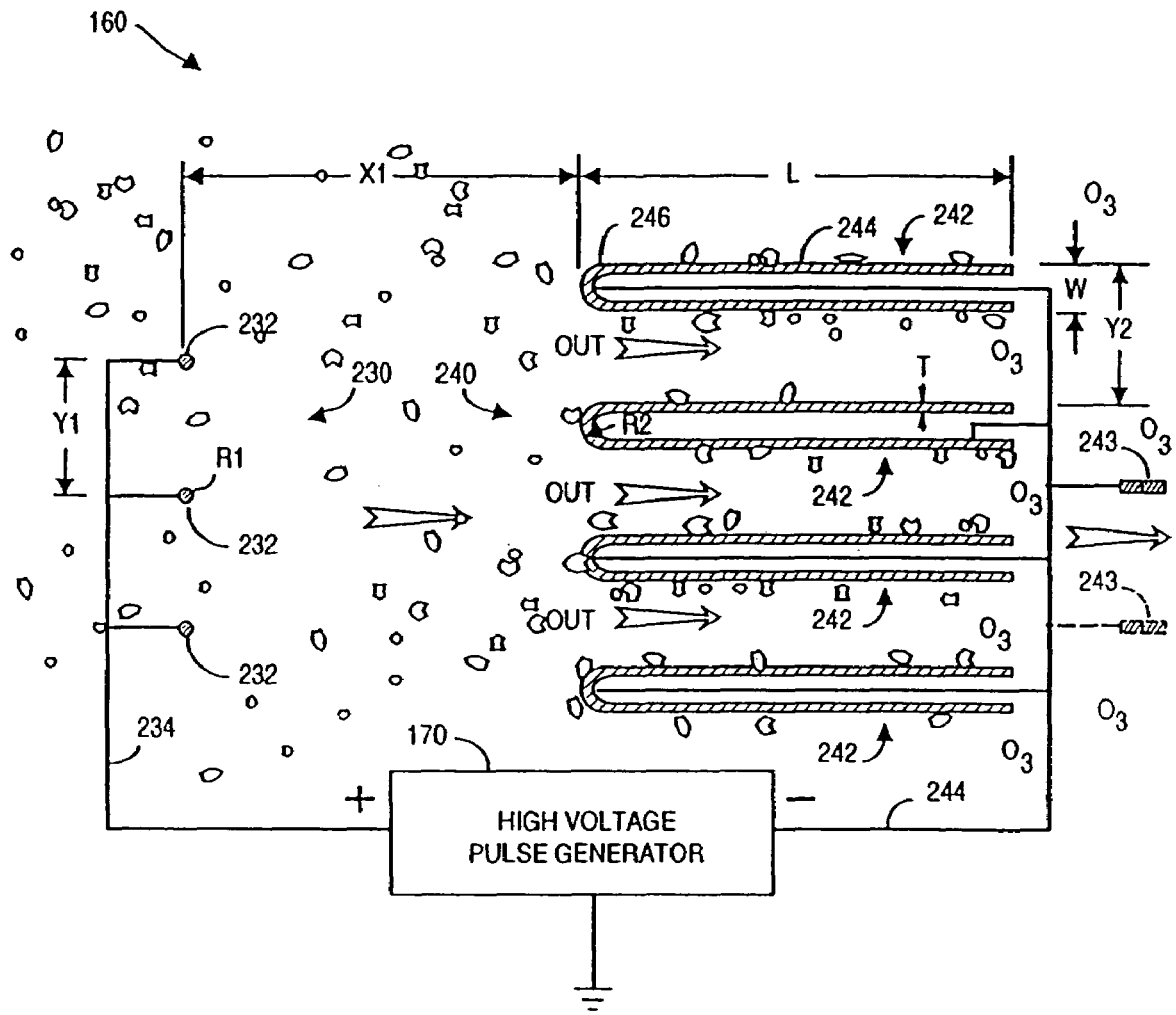
FIG. 4B is a plan block diagram of the embodiment of FIG. 4A.

Turning now to the embodiments of FIGS. 4A and 4B, electrode assembly 220 comprises a first array 230 of wire electrodes 232, and a second array 240 of generally "U"-shaped electrodes 242. In preferred embodiments, the number N1 of electrodes comprising the first array will preferably differ by one relative to the number N2 of electrodes comprising the second array. In many of the embodiments shown, N2>N1. However, if desired, in FIG. 4A, addition first electrodes 232 could be added at the out ends of array 230 such that N1>N2, e.g., five electrodes 232 compared to four electrodes 242.

Electrodes 232 are preferably lengths of tungsten wire, whereas electrodes 242 are formed from sheet metal, preferably stainless steel, although brass or other sheet metal could be used. The sheet metal is readily formed to define side regions 244 and bulbous nose region 246 for hollow elongated "U" shaped electrodes 242. While FIG. 4A depicts four electrodes 242 in second array 240 and three electrodes 232 in first array 230, as noted, other numbers of electrodes in each array could be used, preferably retaining a symmetrically staggered configuration as shown. It is seen in FIG. 4A that while particulate matter 60 is present in the incoming (IN) air, the outflow (OUT) air is substantially devoid of particulate matter, which adheres to the preferably large surface area provided by the second array electrodes (see FIG. 4B).

As best seen in FIG. 4B, the spaced-apart configuration between the arrays is staggered such that each first array electrode 232 is substantially equidistant from two second array electrodes 242. This symmetrical staggering has been found to be an especially efficient electrode placement. Preferably the staggering geometry is symmetrical in that adjacent electrodes 232 or adjacent electrodes 242 are spaced-apart a constant distance, Y1 and Y2 respectively. However, a non-symmetrical configuration could also be used, although ion emission and air flow would likely be diminished. Also, it is understood that the number of electrodes 232 and 242 may differ from what is shown.

In FIG. 4A, typically dimensions are as follows: diameter of electrodes 232 is about 0.08 mm, distances Y1 and Y2 are each about 16 mm, distance X1 is about 16 mm, distance L is about 20 mm, and electrode heights Z1 and Z2 are each about 1 m. The width W of electrodes 242 is preferably about 4 mm, and the thickness of the material from which electrodes 242 are formed is about 0.5 mm. Of course other dimensions and shapes could be used. It is preferred that electrodes 232 be small in diameter to help establish a desired high voltage field. On the other hand, it is desired that electrodes 232 (as well as electrodes 242) be sufficiently robust to withstand occasional cleaning.

Electrodes 232 in first array 230 are coupled by a conductor 234 to a first (preferably positive) output port of high voltage pulse generator 170, and electrodes 242 in second array 240 are coupled by a conductor 244 to a second (preferably negative) output port of generator 170. It is relatively unimportant where on the various electrodes electrical connection is made to conductors 234 or 244. Thus, by way of example FIG. 4B depicts conductor 244 making connection with some electrodes 242 internal to bulbous end 246, while other electrodes 242 make electrical connection to conductor 244 elsewhere on the electrode. Electrical connection to the various electrodes 242 could also be made on the electrode external surface providing no substantial impairment of the outflow airstream results.

To facilitate removing the electrode assembly from unit 100 (as shown in FIG. 2B), it is preferred that the lower end of the various electrodes fit against mating portions of wire or other conductors 234 or 244. For example, "cup-like" members can be affixed to wires 234 and 244 into which the free ends of the various electrodes fit when electrode array 220 is inserted completely into housing 102 of unit 100.

The ratio of the effective electric field emanating area of electrode 232 to the nearest effective area of electrodes 242 is at least about 15:1, and preferably is at least 20:1. Thus, in the embodiment of FIG. 4A and FIG. 4B, the ratio R2/R1≈2 mm/0.04 mm≈50:1.

In this and the other embodiments to be described herein, ionization appears to occur at the smaller electrode(s) 232 in the first electrode array 230, with ozone production occurring as a function of high voltage arcing. For example, increasing the peak-to-peak voltage amplitude and/or duty cycle of the pulses from the high voltage pulse generator 170 can increase ozone content in the output flow of ionized air. If desired, user-control S2 can be used to somewhat vary ozone content by varying (in a safe manner) amplitude and/or duty cycle. Specific circuitry for achieving such control is known in the art and need not be described in detail herein.

Note the inclusion in FIGS. 4A and 4B of at least one output controlling electrode 243, preferably electrically coupled to the same potential as the second array electrodes. Electrode 243 preferably defines a pointed shape in side profile, e.g., a triangle. The sharp point on electrode(s) 243 causes generation of substantial negative ions (since the electrode is coupled to relatively negative high potential). These negative ions neutralize excess positive ions otherwise present in the output air flow, such that the OUT flow has a net negative charge. Electrode(s) 243 preferably are stainless steel, copper, or other conductor, and are perhaps 20 mm high and about 12 mm wide at the base.

Another advantage of including pointed electrodes 243 is that they may be stationarily mounted within the housing of unit 100, and thus are not readily reached by human hands when cleaning the unit. Were it otherwise, the sharp point on electrode(s) 243 could easily cause cuts. The inclusion of one electrode 243 has been found sufficient to provide a sufficient number of output negative ions, but more such electrodes may be included.

Figure 4C:
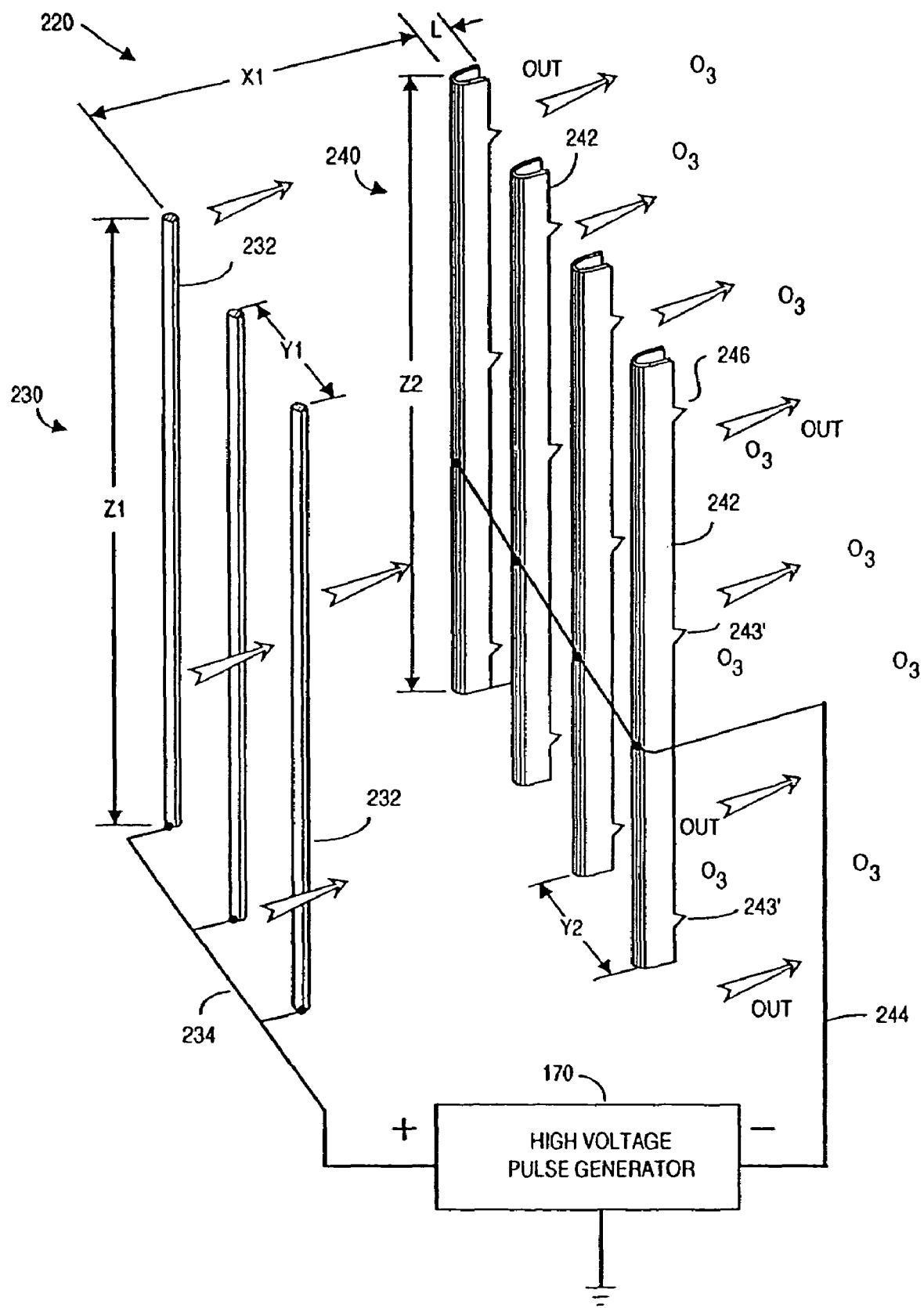
FIG. 4C is a perspective block diagram showing a second embodiment for an electrode assembly, according to the present invention.

In the embodiment of FIGS. 4A and 4C, each "U"-shaped electrode 242 has two trailing edges that promote efficient kinetic transport of the outflow of ionized air and $O_3$. Note the inclusion on at least one portion of a trailing edge of a pointed electrode region 243'. Electrode region 243' helps promote output of negative ions, in the same fashion as was described with respect to FIGS. 4A and 4B. Note, however, the higher likelihood of a user cutting himself or herself when wiping electrodes 242 with a cloth or the like to remove particulate matter deposited thereon. In FIG. 4C and the figures to follow, the particulate matter is omitted for ease of illustration. However, from what was shown in FIGS. 2A-4B, particulate matter will be present in the incoming air, and will be substantially absent from the outgoing air. As has been described, particulate matter 60 typically will be electrostatically precipitated upon the surface area of electrodes 242.

Figure 4D:
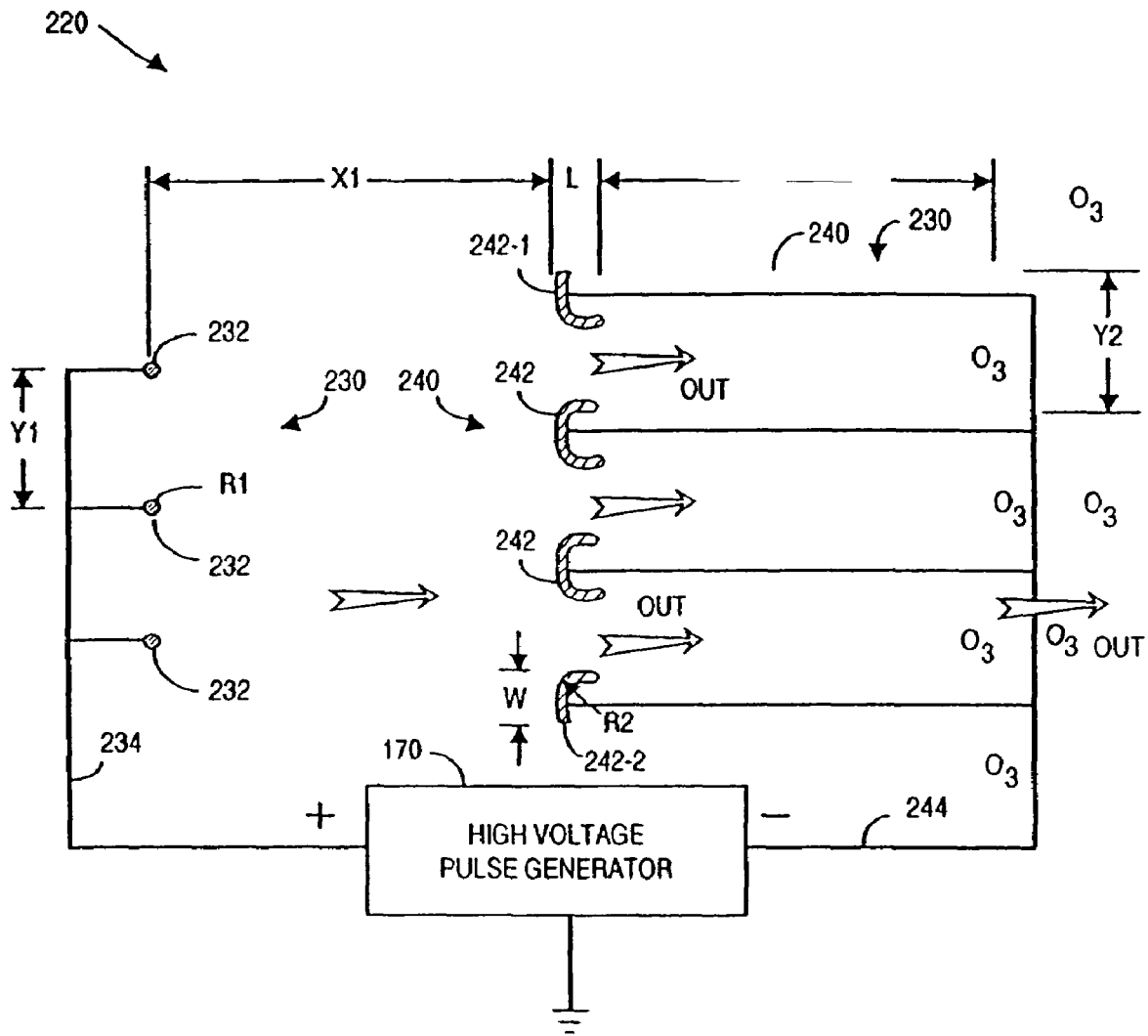
FIG. 4D is a plan block diagram of a modified version of the embodiment of FIG. 4C.

Note that the embodiments of FIGS. 4C and 4D depict somewhat truncated versions of electrodes 242. Whereas dimension L in the embodiment of FIGS. 4A and 4B was about 20 mm, in FIGS. 4C and 4D, L has been shortened to about 8 mm. Other dimensions in FIG. 4C preferably are similar to those stated for FIGS. 4A and 4B. In FIGS. 4C and 4D, the inclusion of point-like regions 246 on the trailing edge of electrodes 242 seems to promote more efficient generation of ionized air flow. It will be appreciated that the configuration of second electrode array 240 in FIG. 4C can be more robust than the configuration of FIGS. 4A and 4B, by virtue of the shorter trailing edge geometry. As noted earlier, a symmetrical staggered geometry for the first and second electrode arrays is preferred for the configuration of FIG. 4C.

In the embodiment of FIG. 4D, the outermost second electrodes, denoted 242-1 and 242-2, have substantially no outermost trailing edges. Dimension L in FIG. 4D is preferably about 3 mm, and other dimensions may be as stated for the configuration of FIGS. 4A and 4B. Again, the R2/R1 ratio for the embodiment of FIG. 4D preferably exceeds about 20:1.

Figure 4E:
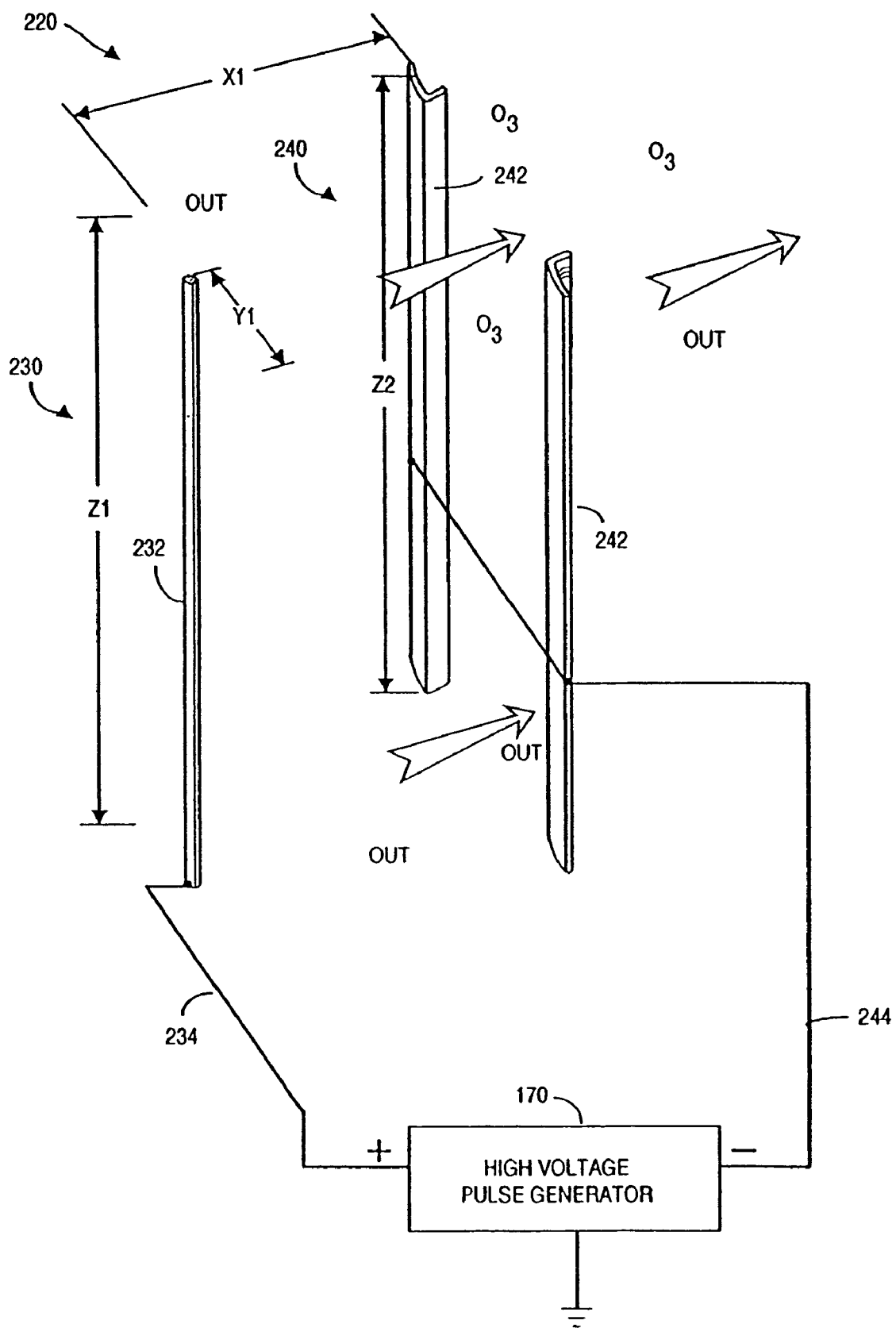
FIG. 4E is a perspective block diagram showing a third embodiment for an electrode assembly, according to the present invention.
Figure 4F:
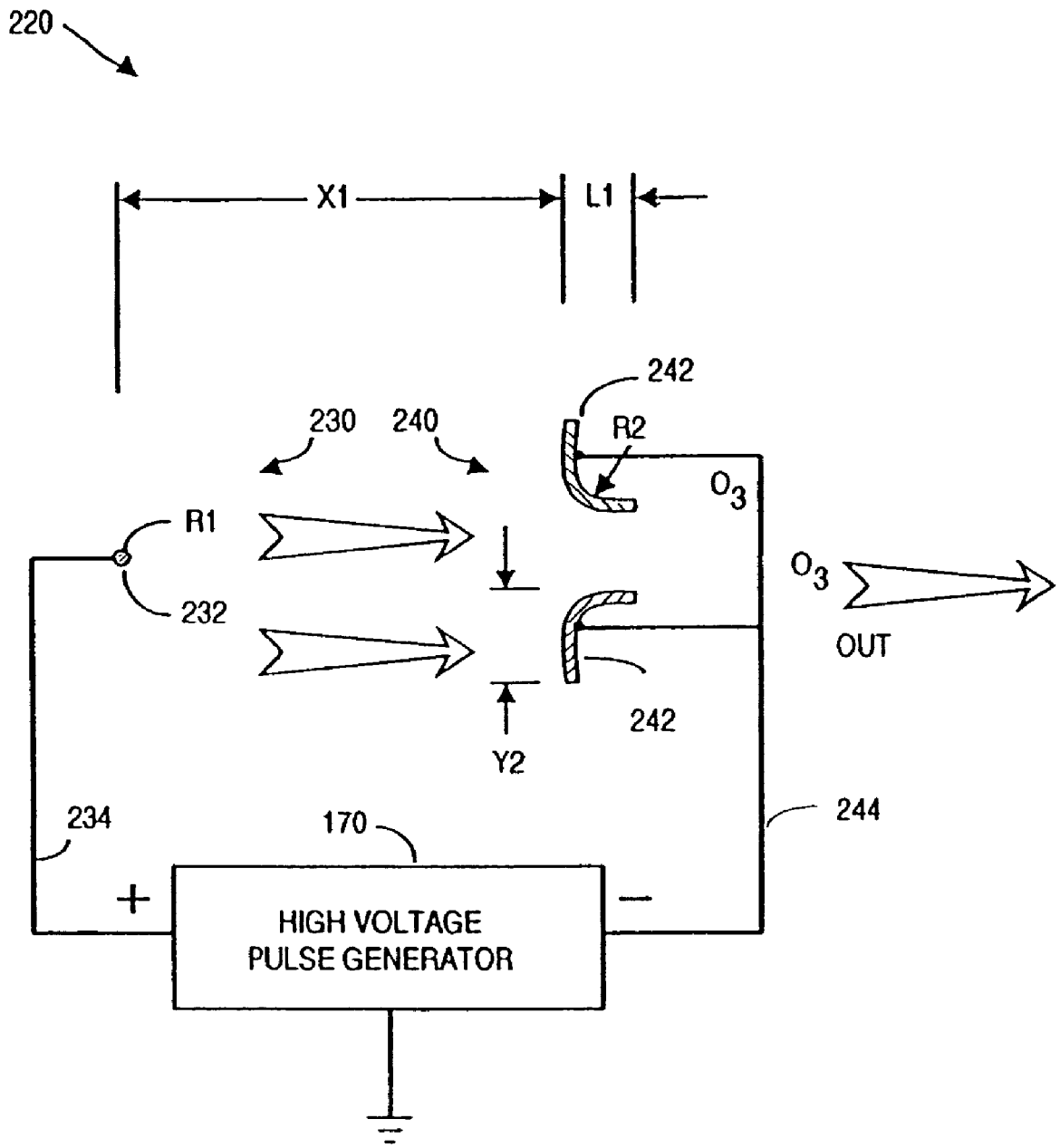
FIG. 4F is a plan block diagram of the embodiment of FIG. 4E.

FIGS. 4E and 4F depict another embodiment of electrode assembly 220, in which the first electrode array comprises a single wire electrode 232, and the second electrode array comprises a single pair of curved "L"-shaped electrodes 242, in cross-section. Typical dimensions, where different than what has been stated for earlier-described embodiments, are X1≈12 mm, Y1≈6 mm, Y2≈5 mm, and L1≈3 mm. The effective R2/R1 ratio is again greater than about 20:1. The fewer electrodes comprising assembly 220 in FIGS. 4E and 4F promote economy of construction, and ease of cleaning, although more than one electrode 232, and more than two electrodes 242 could of course be employed. This embodiment again incorporates the staggered symmetry described earlier, in which electrode 232 is equidistant from two electrodes 242.

Figure 4G:
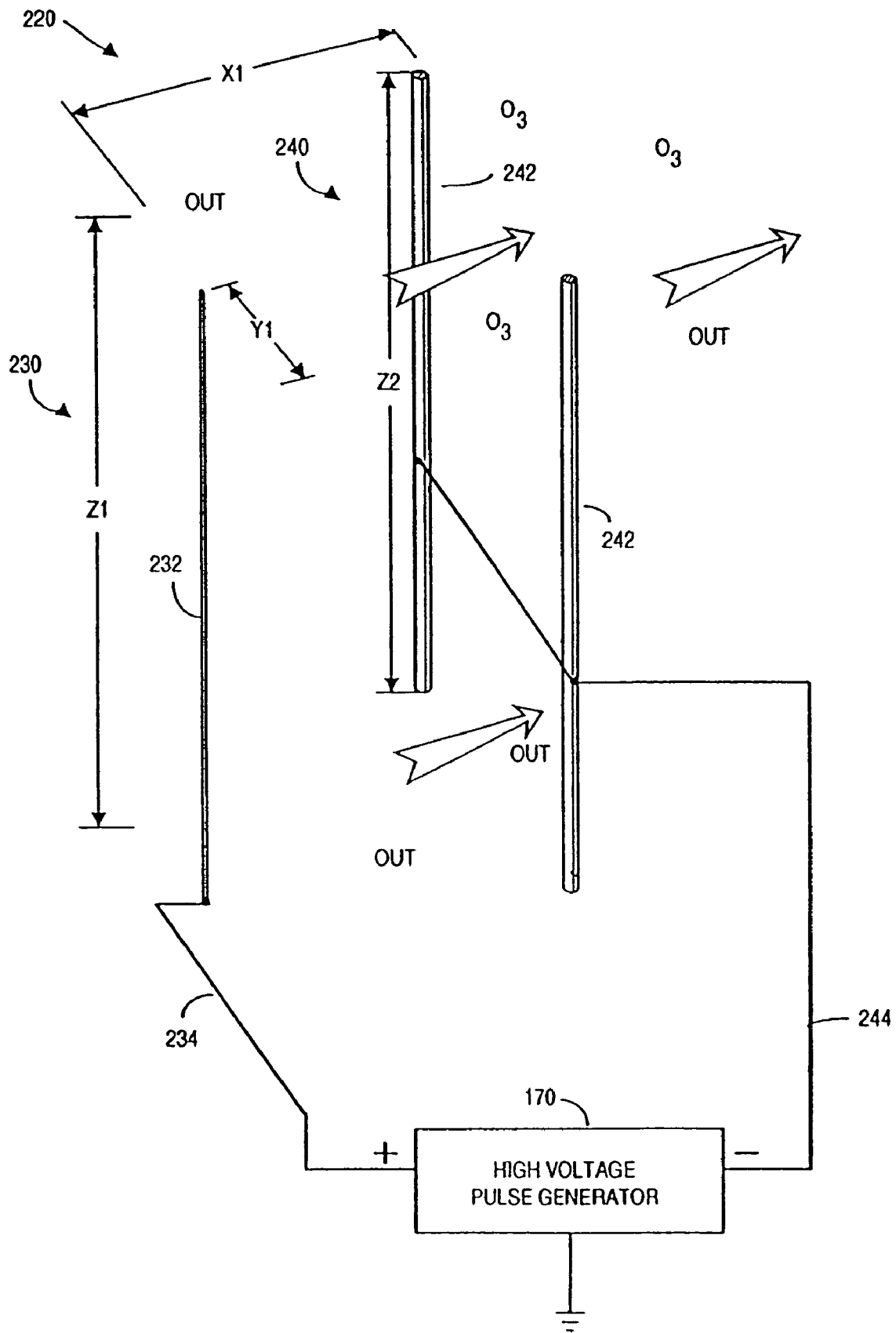
FIG. 4G is a perspective block diagram showing a fourth embodiment for an electrode assembly, according to the present invention.
Figure 4H:
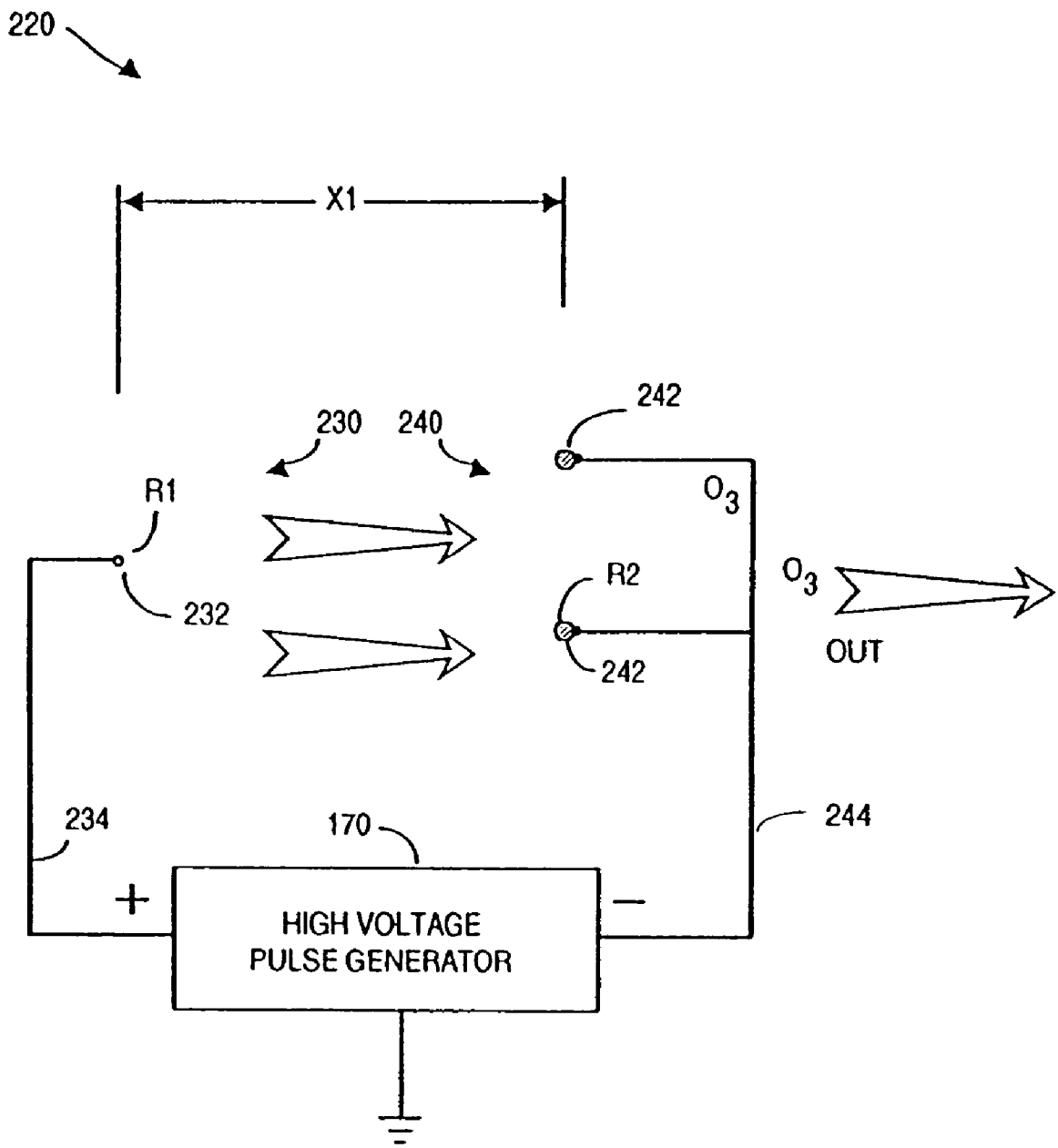
FIG. 4H is a plan block diagram of the embodiment of FIG. 4G.

FIGS. 4G and 4H shown yet another embodiment for electrode assembly 220. In this embodiment, first electrode array 230 is a length of wire 232, while the second electrode array 240 comprises a pair of rod or columnar electrodes 242. As in embodiments described earlier herein, it is preferred that electrode 232 be symmetrically equidistant from electrodes 242. Wire electrode 232 is preferably perhaps 0.08 mm tungsten, whereas columnar electrodes 242 are perhaps 2 mm diameter stainless steel. Thus, in this embodiment the R2/R1 ratio is about 25:1. Other dimensions may be similar to other configurations, e.g., FIGS. 4E, 4F. Of course electrode assembly 220 may comprise more than one electrode 232, and more than two electrodes 242.

Figure 4I:
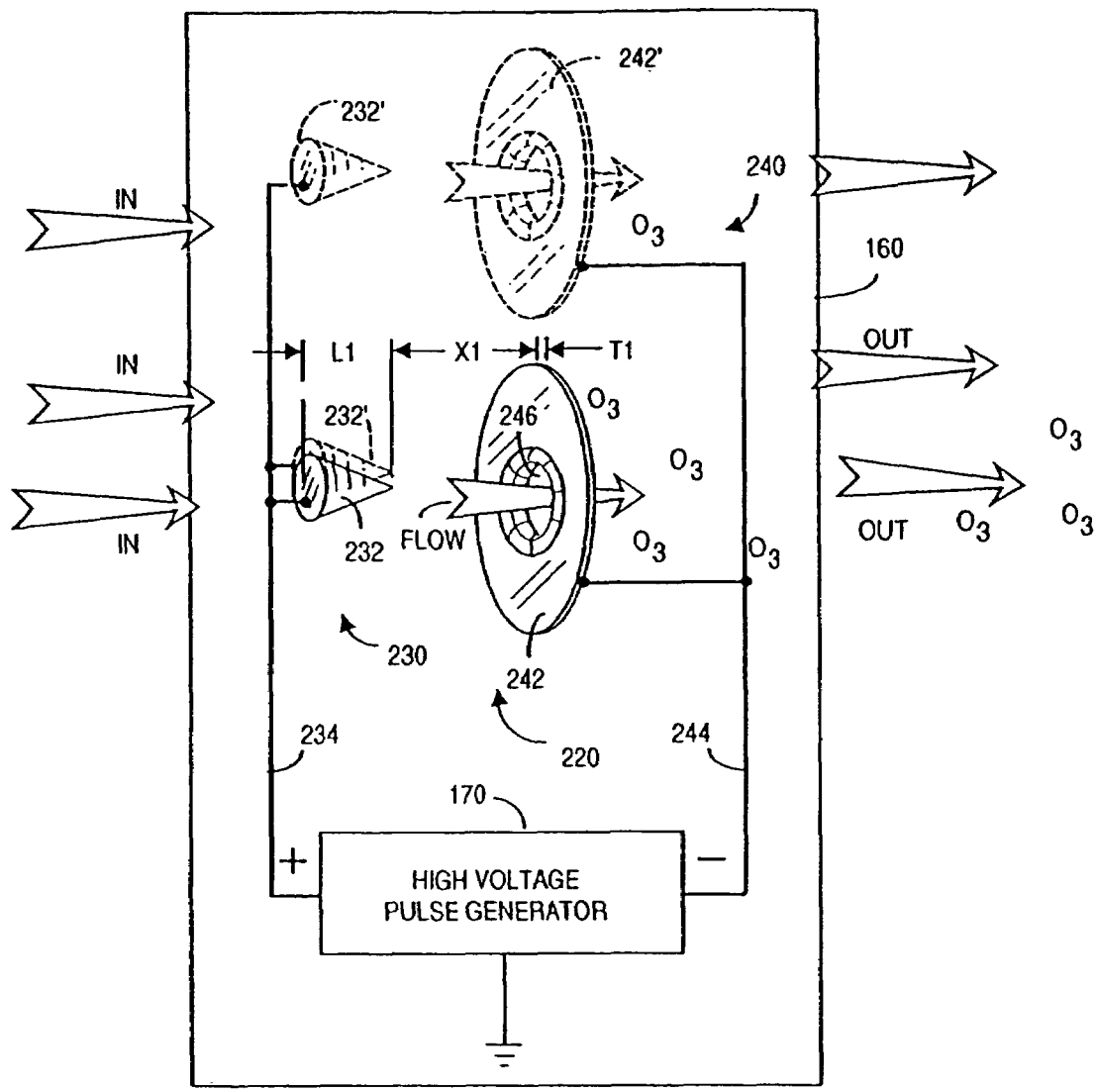
FIG. 4I is a perspective block diagram showing a fifth embodiment for an electrode assembly, according to the present invention.
Figure 4J:
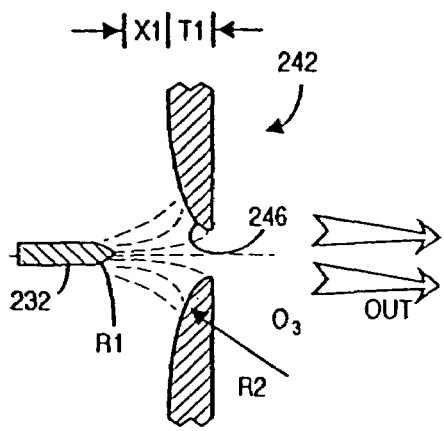
FIG. 4J is a detailed cross-sectional view of a portion of the embodiment of FIG. 4I.

An especially preferred embodiment is shown in FIG. 4I and FIG. 4J. In these figures, the first electrode assembly comprises a single pin-like element 232 disposed coaxially with a second electrode array that comprises a single ring-like electrode 242 having a rounded inner opening 246. However, as indicated by phantom elements 232', 242', electrode assembly 220 may comprise a plurality of such pin-like and ring-like elements. Preferably electrode 232 is tungsten, and electrode 242 is stainless steel.

Typical dimensions for the embodiment of FIG. 4I and FIG. 4J are L1≈10 mm, X1≈9.5 mm, T≈0.5 mm, and the diameter of opening 246 is about 12 mm. Dimension L1 preferably is sufficiently long that upstream portions of electrode 232 (e.g., portions to the left in FIG. 4I) do not interfere with the electrical field between electrode 232 and the collector electrode 242. However, as shown in FIG. 4J, the effect R2/R1 ratio is governed by the tip geometry of electrode 232. Again, in the preferred embodiment, this ratio exceeds about 20:1. Lines drawn in phantom in FIG. 4J depict theoretical electric force field lines, emanating from emitter electrode 232, and terminating on the curved surface of collector electrode 246. Preferably the bulk of the field emanates within about ±45° of coaxial axis between electrode 232 and electrode 242. On the other hand, if the opening in electrode 242 and/or electrode 232 and 242 geometry is such that too narrow an angle about the coaxial axis exists, air flow will be unduly restricted.

One advantage of the ring-pin electrode assembly configuration shown in FIG. 4I is that the flat regions of ring-like electrode 242 provide sufficient surface area to which particulate matter 60 entrained in the moving air stream can attach, yet be readily cleaned.

Further, the ring-pin configuration advantageously generates more ozone than prior art configurations, or the configurations of FIGS. 4A-4H. For example, whereas the configurations of FIGS. 4A-4H may generate perhaps 50 ppb ozone, the configuration of FIG. 4I can generate about 2,000 ppb ozone.

Figure 4K:
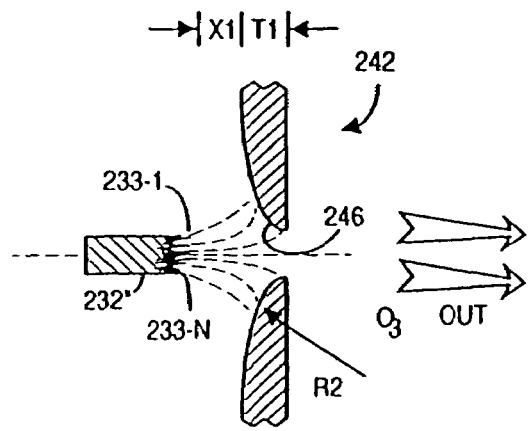
FIG. 4K is a detailed cross-sectional view of a portion of an alternative to the embodiment of FIG. 4I.

Nonetheless it will be appreciated that applicants' first array pin electrodes may be utilized with the second array electrodes of FIGS. 4A-4H. Further, applicants' second array ring electrodes may be utilized with the first array electrodes of FIGS. 4A-4H. For example, in modifications of the embodiments of FIGS. 4A-4H, each wire or columnar electrode 232 is replaced by a column of electrically series-connected pin electrodes (e.g., as shown in FIGS. 4I-4K), while retaining the second electrode arrays as depicted in these figures. By the same token, in other modifications of the embodiments of FIGS. 4A-4H, the first array electrodes can remain as depicted, but each of the second array electrodes 242 is replaced by a column of electrically series-connected ring electrodes (e.g., as shown in FIGS. 4I-4K).

In FIG. 4J, a detailed cross-sectional view of the central portion of electrode 242 in FIG. 4I is shown. As best seen in FIG. 4J, curved region 246 adjacent the central opening in electrode 242 appears to provide an acceptably large surface area to which many ionization paths from the distal tip of electrode 232 have substantially equal path length. Thus, while the distal tip (or emitting tip) of electrode 232 is advantageously small to concentrate the electric field between the electrode arrays, the adjacent regions of electrode 242 preferably provide many equidistant inter-electrode array paths. A high exit flowrate of perhaps 90 feet/minute and 2,000 ppb range ozone emission attainable with this configuration confirm a high operating efficiency.

In FIG. 4K, one or more electrodes 232 is replaced by a conductive block 232" of carbon fibers, the block having a distal surface in which projecting fibers 233-1, . . . 233-N take on the appearance of a "bed of nails". The projecting fibers can each act as an emitting electrode and provide a plurality of emitting surfaces. Over a period of time, some or all of the electrodes will literally be consumed, whereupon graphite block 232" will be replaced. Materials other than graphite may be used for block 232" providing the material has a surface with projecting conductive fibers such as 233-N.

As described, the net output of ions is influenced by placing a bias element (e.g., element 243) near the output stream and preferably near the downstream side of the second array electrodes. If no ion output were desired, such an element could achieve substantial neutralization. It will also be appreciated that the present invention could be adjusted to produce ions without producing ozone, if desired.

Modifications and variations may be made to the disclosed embodiments without departing from the subject and spirit of the invention as defined by the following claims.

We claim:

1. An air treatment apparatus comprising:
a housing having:
(a) a bottom portion;
(b) a top portion; and
(c) a body portion positioned between the bottom portion and the top portion, the body portion extending along a first axis, the body portion having:
(i) at least one intake vent; and
(ii) at least on exhaust vent;
a first electrode supported by the housing;
a second electrode configured to be removably supported by the housing;
a voltage generator operatively coupled to the electrodes, the voltage generator being configured to cause a plurality of ions to flow toward the second electrode along a second axis, the second axis being substantially perpendicular to the first axis; and
a circuitry supported by the housing, the circuitry configured to cause the voltage generator to increase the flow of ions for a designated period of time after a designated event occurs by increasing the potential of the first electrode.

2. The air treatment apparatus of claim 1, the body portion of the housing having an inner wall, the inner wall defining a slot configured to receive the second electrode, the second electrode configured to be slidably removable through the slot.

3. The air treatment apparatus of claim 2, which includes a handle coupled to the second electrode.

4. The air treatment apparatus of claim 1, which includes a grasp coupled to the second electrode.

5. The air treatment apparatus of claim 1, which includes a pedestal coupled to the bottom portion of the housing.

6. The air treatment apparatus of claim 1, which includes at least one input device coupled to the top portion of the housing.

7. The air treatment apparatus of claim 1, which includes at least one output device coupled to the top portion of the housing.

8. The air treatment apparatus of claim 7, the output device including a light source.

9. The air treatment apparatus of claim 1, which includes the circuitry supported by the housing, the circuitry configured to cause the voltage generator to increase the flow of ions based on an input provided by a user.

10. An air treatment apparatus comprising:
a housing having:
(a) a bottom portion;
(b) a top portion; and
(c) a body portion positioned between the bottom portion and the top portion, the body portion extending along a first axis, the body portion having:
(i) at least one intake vent;
(ii) at least one exhaust vent; and
(iii) an inner wall which defines a slot;
a first electrode supported by the housing;
a second electrode configured to be:
(i) removably supported by the housing; and
(ii) slidably removable through the slot;
a voltage generator operatively coupled to the electrodes, the voltage generator being configured to cause a plurality of ions to flow toward the second electrode along a second axis, the second axis being substantially perpendicular to the first; and
a circuitry supported by the housing, the circuitry configured to cause the voltage generator to increase the flow of ions for a designated period of time after a designated event occurs by increasing the potential of the first electrode.

11. The air treatment apparatus of claim 10, which includes a grasp coupled to the second electrode.

12. The air treatment apparatus of claim 11, which includes a handle coupled to the second electrode.

13. The air treatment apparatus of claim 10, which includes a pedestal coupled to the bottom portion of the housing.

14. The air treatment apparatus of claim 10, which includes at least one input device coupled to the top portion of the housing.

15. The air treatment apparatus of claim 10, which includes at least one output device coupled to the top portion of the housing.

16. The air treatment apparatus of claim 15, the output device including a light source.

17. The air treatment apparatus of claim 10, which includes the circuitry supported by the housing, the circuitry configured to cause the voltage generator to increase the flow of ions based on an input provided by a user.

18. An air treatment apparatus comprising:
an housing having:
(a) an elongated shape;
(b) a bottom portion;
(c) a top portion; and
(d) a body portion positioned between the bottom portion and the top portion, the body portion extending along a first axis, the body portion having:
(i) at least one intake vent;
(ii) at least one exhaust vent; and
(iii) an inner wall which defines a slot;
a first electrode supported by the housing;
a second electrode configured to be:
(i) removably supported by the housing; and
(ii) slidably removable through the slot;
a voltage generator operatively coupled to the electrodes, the voltage generator being configured to cause a plurality of ions to flow toward the second electrode along a second axis, the second axis being substantially perpendicular to the first axis;
a circuitry supported by the housing, the circuitry configured to cause the voltage generator to increase the flow of ions for a designated period of time after a designated event occurs by increasing the potential of the first electrode; and
a grasp coupled to the second electrode.

19. The air treatment apparatus of claim 18, which includes a handle coupled to the second electrode.

20. The air treatment apparatus of claim 18, which includes a pedestal coupled to the bottom portion of the housing.

21. The air treatment apparatus of claim 18, which includes at least one input device coupled to the top portion of the housing.

22. The air treatment apparatus of claim 18, which includes at least one output device coupled to the top portion of the housing.

23. The air treatment apparatus of claim 22, the output device including a light source.

24. The air treatment apparatus of claim 18, which includes the circuitry supported by the housing, the circuitry configured to cause the voltage generator to increase the flow of ions based on an input provided by a user.

* * * * *